United States Patent
Amano

(10) Patent No.: US 10,048,476 B2
(45) Date of Patent: Aug. 14, 2018

(54) PROJECTION OPTICAL SYSTEM AND PROJECTION TYPE DISPLAY DEVICE

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 144 days.

(21) Appl. No.: 15/044,531

(22) Filed: Feb. 16, 2016

(65) Prior Publication Data
US 2016/0246037 A1   Aug. 25, 2016

(30) Foreign Application Priority Data
Feb. 25, 2015   (JP) ................. 2015-035085

(51) Int. Cl.
| | | |
|---|---|---|
| *G02B 17/00* | (2006.01) | |
| *G02B 13/06* | (2006.01) | |
| *G02B 13/22* | (2006.01) | |
| *G03B 21/28* | (2006.01) | |
| *G02B 13/16* | (2006.01) | |

(52) U.S. Cl.
CPC .......... *G02B 17/008* (2013.01); *G02B 13/06* (2013.01); *G02B 13/22* (2013.01); *G02B 13/16* (2013.01); *G03B 21/28* (2013.01)

(58) Field of Classification Search
CPC ........ G02B 13/06; G02B 13/16; G02B 13/22; G02B 17/008; G03B 21/28
USPC .................. 359/792, 689, 649–65
See application file for complete search history.

(56) References Cited

U.S. PATENT DOCUMENTS

| | | | | |
|---|---|---|---|---|
| 5,138,493 A | * | 8/1992 | Iwasaki ................ | G02B 15/167 359/679 |
| 7,631,975 B2 | * | 12/2009 | Takaura ................ | G02B 13/16 353/102 |
| 2008/0137216 A1 | * | 6/2008 | Nagatoshi ............ | G02B 13/22 359/714 |
| 2011/0002034 A1 | | 1/2011 | Shimo et al. | |

FOREIGN PATENT DOCUMENTS

| | | |
|---|---|---|
| JP | 2006/330410 A | 12/2006 |
| WO | 2009/107553 A1 | 9/2009 |

* cited by examiner

*Primary Examiner* — Thomas K Pham
*Assistant Examiner* — Vipin Patel
(74) *Attorney, Agent, or Firm* — Studebaker & Brackett PC

(57) ABSTRACT

A projection optical system is constituted by, in order from the reduction side, a first optical system for forming an image displayed by image display elements as an intermediate image, a first optical path bending means that bends an optical path with a reflective surface, and a second optical system for forming the intermediate image on a magnification side conjugate plane. The second optical system is constituted by, in order from the reduction side, a first lens group having a positive refractive power, a second optical path bending means that bends an optical path with a reflective surface, and a second lens group having a positive refractive power. Conditional Formulae (1) and (2) below are satisfied.

$$10.0 < TL1/|f| < 50.0 \quad (1)$$

$$4.0 < TL21/|f| < 30.0 \quad (2).$$

19 Claims, 15 Drawing Sheets

EXAMPLE 1

EXAMPLE 2

EXAMPLE 4

PROJECTION OPTICAL SYSTEM AND PROJECTION TYPE DISPLAY DEVICE

CROSS REFERENCE TO RELATED APPLICATIONS

The present application claims priority under 35 U.S.C. § 119 to Japanese Patent Application No. 2015-035085 filed on Feb. 25, 2015. The above application is hereby expressly incorporated by reference, in its entirety, into the present application.

BACKGROUND

The present disclosure is related to a projection optical system and a projection type display device. Particularly, the present disclosure is related to a projection optical system which is favorably suited for use in a projection type display device having light valves such as liquid crystal display elements or DMD's (Digital Micromirror Devices®), and a projection type display device that employs this projection optical system.

Recently, projection type display devices (also referred to as "projectors") which are equipped with light valves such as liquid crystal display elements and DMD's (Digital Micromirror Devices®) are in wide use, and the performance thereof is increasing. Particularly, accompanying the improved performance of recent light valves, there is great demand for the resolution of projection optical systems to be improved as well.

In addition, there is increasing demand for projection optical systems having higher performance and wider angles of view to be mounted in projection type display devices, taking increases in the degree of freedom in setting distances to screens and installation properties within interior spaces into consideration.

Projection optical systems that form an intermediate image with a first optical system constituted by a plurality of lenses, then perform refocusing operations with a second optical system also constituted by a plurality of lenses have been proposed, in order to meet these demands (refer to International Patent Publication No. 09/107553 and Japanese Unexamined Patent Publication No. 2006-330410).

In a projection optical system constituted by an ordinary optical system that does not form an intermediate image, if a widening of the angle of view is achieved by shortening the focal length thereof, the lenses toward the magnification side will become excessively large. In contrast, a projection optical system that forms an intermediate image as described above is capable of shortening the back focus of the second optical system while decreasing the diameters of lenses of the second optical system toward the magnification side, and is favorably suited to increasing the angle of view by shortening the focal length thereof.

SUMMARY

However, International Patent Publication No. 09/107553 discloses an optical system in which the second optical system is a fish eye lens, which results in distortion remaining to a great degree in a final image surface. Therefore, this optical system is not favorably suited for use as a general projection optical system. In addition, aberrations are corrected independently by a first optical system and a second optical system with an intermediate image at the boundary therebetween in the projection optical system of Japanese Unexamined Patent Publication No. 2006-330410. There-fore, a widening of the angle of view cannot be achieved to a degree which is becoming required recently. Further, because the optical systems disclosed in both International Patent Publication No. 09/107553 and Japanese Unexamined Patent Publication No. 2006-330410 form an intermediate image, the total lengths of these optical systems will increase as a matter of course.

The present disclosure has been developed in view of the foregoing circumstances. The present disclosure provides a projection optical system that forms an intermediate image having high projection performance with a wide angle of view, in which various aberrations are favorably corrected and that achieves miniaturization. The present disclosure also provides a projection type display device equipped with this projection optical system.

The projection optical system of the present disclosure is a projection optical system that projects images displayed by image display elements provided on a reduction side conjugate plane onto a magnification side conjugate plane as a magnified image, consisting of, in order from the reduction side to the magnification side:

a first optical system constituted by a plurality of lenses that forms the image displayed by the image display elements as an intermediate image;

a first optical path bending means for bending an optical path with a reflective surface; and a second optical system constituted by a plurality of lenses that focuses the intermediate image on the magnification side conjugate plane;

the second optical system consisting of, in order from the reduction side to the magnification side, a first lens group having a positive refractive power, a second optical path bending means for bending an optical path with a reflective surface, and a second lens group having a positive refractive power; and Conditional Formulae (1) and (2) below being satisfied:

$$10.0 < TL1/|f| < 50.0 \quad (1)$$

$$4.0 < TL2/|f| < 30.0 \quad (2)$$

wherein TL1 is the distance along the optical axis from the surface most toward the reduction side to the surface most toward the magnification side within the first optical system, TL21 is the distance along the optical axis from the surface most toward the reduction side to the surface most toward the magnification side within the first lens group, and f is the focal length of the entire projection optical system.

In the projection optical system of the present disclosure, it is preferable for Conditional Formulae (1-1) and (2-1) below to be satisfied.

$$15.0 < TL1/|f| < 40.0 \quad (1-1)$$

$$6.0 < TL2/|f| < 20.0 \quad (2-1).$$

In addition, it is preferable for Conditional Formulae (3) and (4) below to be satisfied. Note that it is more preferable for Conditional Formulae (3-1) and (4-1) below to be satisfied.

$$8.0 < D12/|f| < 30.0 \quad (3)$$

$$10.0 < D12/|f| < 25.0 \quad (3-1)$$

$$5.0 < D212/|f| < 20.0 \quad (4)$$

$$6.0 < D212/|f| < 15.0 \quad (4-1)$$

wherein D12 is the distance along the optical axis between the first optical system and the second optical system, D212 is the distance along the optical axis between the first lens group and the second lens group, and f is the focal length of the entire projection optical system.

In addition, it is preferable for Conditional Formula (5) below to be satisfied. Note that it is more preferable for Conditional Formula (5-1) below to be satisfied.

$$1.50<f2/|f|<2.80 \quad (5)$$

$$1.52<f2/|f|<2.20 \quad (5\text{-}1)$$

wherein f2 is the focal length of the second optical system, and f is the focal length of the entire projection optical system.

In addition, it is preferable for Conditional Formula (6) below to be satisfied. Note that it is more preferable for Conditional Formula (6-1) below to be satisfied.

$$8.20<Im\varphi\cdot f2/f^2<20.00 \quad (6)$$

$$8.30<Im\varphi\cdot f2/f^2<16.00 \quad (6\text{-}1)$$

wherein $Im\varphi$ is the effective image diameter at the reduction side, f2 is the focal length of the second optical system, and f is the focal length of the entire projection optical system.

In addition, it is preferable for Conditional Formula (7) below to be satisfied. Note that it is more preferable for Conditional Formula (7-1) below to be satisfied.

$$0.020<enP/TL2<0.160 \quad (7)$$

$$0.050<enP/TL2<0.145 \quad (7\text{-}1)$$

wherein enP is the distance along the optical axis from the surface most toward the magnification side in the second optical system to the position of an entrance pupil in the case that the magnification side is a light entry side, and TL2 is the distance along the optical axis from the surface most toward the reduction side in the second optical system to the surface most toward the magnification side in the second optical system.

In addition, it is preferable for Conditional Formula (8) below to be satisfied. Note that it is more preferable for Conditional Formula (8-1) below to be satisfied.

$$0.125<Im\varphi/TL2<0.240 \quad (8)$$

$$0.130<Im\varphi/TL2<0.200 \quad (8\text{-}1)$$

wherein $Im\varphi$ is the effective image diameter at the reduction side, and TL2 is the distance along the optical axis from the surface most toward the reduction side in the second optical system to the surface most toward the magnification side in the second optical system.

In addition, it is preferable for Conditional Formula (9) below to be satisfied. Note that it is more preferable for Conditional Formula (9-1) to be satisfied.

$$0.30<f22/f21<2.00 \quad (9)$$

$$0.40<f22/f21<1.70 \quad (9\text{-}1)$$

wherein f21 is the focal length of the first lens group, and f22 is the focal length of the second lens group.

In addition, it is preferable for Conditional Formula (10) to be satisfied. Note that it is more preferable for Conditional Formula (10-1) to be satisfied.

$$4.0<Bf/|f| \quad (10)$$

$$5.0<Bf/|f|<20.0 \quad (10\text{-}1)$$

wherein Bf is the back focus (air converted distance) of the entire projection optical system, and f is the focal length of the entire projection optical system.

In addition, it is preferable for a principal light ray at the maximum angle of view and the optical axis of the second optical system to intersect between the first lens group and the second lens group.

In addition, the intermediate image may be configured such that the peripheral portion has more field curvature toward the first optical system than the portion thereof at the center of the optical axis.

In addition, it is preferable for the first optical path bending means and/or the second optical path bending means to be a mirror.

In addition, it is preferable for the first optical path bending means and/or the second optical path bending means to be provided at orientations that bend optical paths at angles of 90 degrees.

In addition, it is preferable for images which are displayed by image display elements to be projected as enlarged images which are inverted 180 degrees.

A projection type display device of the present disclosure comprises a light source, light valves into which light from the light source enters, and a projection optical system of the present disclosure as a projection optical system that projects an optical image formed by light which is optically modulated by the light valves.

Note that the "magnification side" refers to the side toward which optical images are projected (the side toward a screen). For the sake of convenience, the side toward the screen will be referred to as the magnification side even in cases that optical images are reduced and projected. Meanwhile, the "reduction side" refers to a side toward an original image display region (the side toward a light valve). For the sake of convenience, the side toward the light valve will be referred to as the reduction side even in cases that images are reduced and projected.

In addition, the expression "consisting of" means that the projection optical system may include: lenses without any practical refractive power; and optical elements other than lenses such as stops, masks, a cover glass, and filters, in addition to the constituent elements which are listed above.

In addition, a "lens group" is not necessarily constituted by a plurality of lenses, and may be constituted by a single lens.

In addition, with respect to the "back focus", the magnification side and the reduction side are respectively considered as corresponding to the object side and the image side of a common imaging lens, and the magnification side and the reduction side are respectively designated as the front side and the back side of the optical system.

In addition, "$Im\varphi$" can be obtained from the specification of the projection optical system, the specification of the apparatus on which the projection optical system is mounted, for example.

In addition, the surface shapes and the signs of the refractive indices of the lenses are those which are considered in the paraxial region in cases that aspherical surfaces are included.

The projection optical system of the present disclosure is a projection optical system that projects images displayed by image display elements provided on a reduction side conjugate plane onto a magnification side conjugate plane as a magnified image, consisting of, in order from the reduction side to the magnification side: a first optical system constituted by a plurality of lenses that forms the image displayed by the image display elements as an intermediate image; a first optical path bending means for bending an optical path with a reflective surface; and a second optical system constituted by a plurality of lenses that focuses the intermediate image on the magnification side conjugate plane; the second optical system consisting of, in order from the reduction side to the magnification side, a first lens group having a positive refractive power, a second optical path bending means for bending an optical path with a reflective surface, and a second lens group having a positive refractive power; and Conditional Formulae (1) and (2) below being satisfied:

$$10.0 < TL1/|f| < 50.0 \quad (1)$$

$$4.0 TL2/|f| < 30.0 \quad (2)$$

Therefore, it becomes possible to realize a projection optical system having high projection performance with a wide angle of view, in which various aberrations are favorably corrected and that achieves miniaturization.

In addition, the projection type display device of the present disclosure is equipped with the projection optical system of the present disclosure. Therefore, the apparatus can be miniaturized, and images having high image quality can be projected at a wide angle of view.

DETAILED DESCRIPTION OF THE PREFERRED EMBODIMENTS

Figure 1:
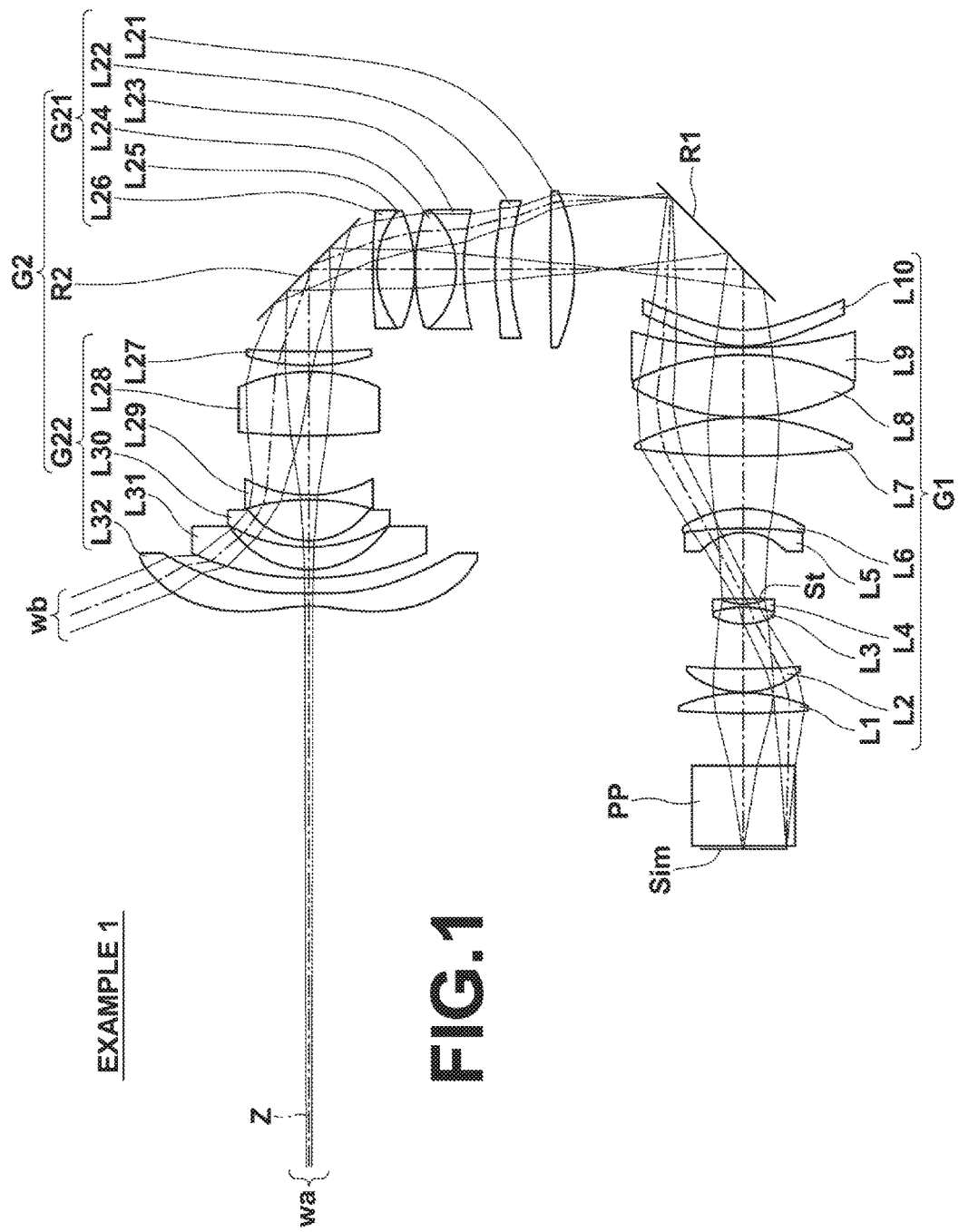
FIG. 1 is a sectional diagram that illustrates the configuration of a projection optical system according to an embodiment of the present disclosure (common with Example 1).

Hereinafter, embodiments of the present disclosure will be described in detail with reference to the accompanying drawings. FIG. 1 is a sectional diagram that illustrates the configuration of a projection optical system according to an embodiment of the present disclosure. The example illustrated in FIG. 1 corresponds to a projection optical system of Example 1 to be described later. In FIG. 1, the side of an image display surface Sim is the reduction side, and the side of a final lens L32 of the second optical system G2 is the magnification side. The aperture stop St illustrated in FIG. 1 does not necessarily represent the size or shape thereof, but the position thereof along an optical axis Z. In addition, FIG. 1 also shows an axial light beam wa and a light beam wb at a maximum angle of view.

This projection optical system may be mounted in a projection type display device and utilized to project image information displayed on light valves onto a screen. In FIG. 1, a case in which the projection optical system is mounted in a projection type display device is assumed, and an optical member PP that assumes filters, prisms, and the like which are employed in a color combining section or an illuminating light separating section as well as the image display surface Sim of the light valves positioned at the surface of the optical member PP toward the reduction side are also illustrated. In the projection type display device, light beams onto which image information is imparted by the image display surface Sim enter the projection optical system via the optical member PP, and are projected onto a screen (not shown) by the projection optical system.

As illustrated in FIG. 1, the projection optical system consists of, in order from the reduction side to the magnification side: a first optical system G1 constituted by a plurality of lenses that forms the image displayed by the image display elements as an intermediate image; a first optical path bending means R1 for bending an optical path with a reflective surface, and a second optical system G2 constituted by a plurality of lenses that focuses the intermediate image on a magnification side conjugate plane.

The second optical system G2 consists of, in order from the reduction side to the magnification side, a first lens group G21 having a positive refractive power, a second optical path bending means R2 for bending an optical path with a reflective surface, and a second lens group G22 having a positive refractive power.

In an ordinary projection optical system constituted only by an optical system that does not form an intermediate image, if a widening of the angle of view is achieved by shortening the focal length thereof, the lenses toward the magnification side will become excessively large. In contrast, the projection optical system of the present embodiment that forms an intermediate image is capable of shortening the back focus of the second optical system G2 while decreasing the diameters of lenses of the second optical system G2 toward the magnification side, and is favorably suited to increasing the angle of view by shortening the focal length thereof.

By providing the optical path bending means in intermediate positions within the projection optical system in this manner, the optical path bending means can be miniaturized compared to a case in which an optical path bending means is provided at the magnification side of a projection optical system. In addition, by providing two optical path bending means within the projection optical system, miniaturization of the projection optical system as a whole and control of the projection direction is facilitated.

Note that in the projection optical system of the present embodiment, the reduction side is configured to be telecentric. Here, the expression "the reduction side is telecentric" means that an angular line that bisects the cross section of a light beam focused at an arbitrary point on the image display surface Sim, which is the reduction conjugate plane, between the maximum ray of light at the upper side and the maximum ray of light at the lower side thereof is close to being parallel with the optical axis Z. The expression "the reduction side is telecentric" is not limited to cases in which the reduction side is completely telecentric, that is, cases in which the bisecting angular line is completely parallel to the optical axis, but also refers to cases in which a certain degree of error is present. Here, the certain degree of error refers to a range of inclination between the bisecting angular line and the optical axis Z of ±3°.

In addition, the projection optical system is configured such that Conditional Formulae (1) and (2) below are satisfied. Conditional Formula (1) defines the ratio between the lens length of the first optical system G1 and the focal length of the entire projection optical system. By Conditional Formula (1) being satisfied, the relay magnification rate of the first optical system can be favorably maintained, a widening of the angle of view can be achieved, various aberrations can be corrected, and miniaturization can be achieved. By configuring the projection optical system such that the value of TL1/|f| is not greater than or equal to the upper limit defined in Conditional Formula (1), the lens length of the first optical system G1 can be prevented from becoming excessively long, and miniaturization can be achieved. By configuring the projection optical system such that the value of TL1/|f| is not less than or equal to the lower limit defined in Conditional Formula (1), the relay magnification rate of the first optical system G1 can be prevented from becoming excessively great. As a result, the diameters of the lenses within the second optical system G2 can be prevented from increasing. In addition, correction of distortion and field curvature by the second optical system G2 will be facilitated. Further, the light emission angles from the first optical system G1 to the second optical system G2 can be prevented from becoming excessively large in the dispersing direction. Therefore, securing space for bending optical paths is facilitated. Conditional Formula (2) defines the ratio between the lens length of the first lens group G21 and the focal length of the entire projection optical system. By Conditional Formula (2) being satisfied, an appropriate distance can be maintained between the first optical path bending means R1 and the second optical path bending means R2, while achieving miniaturization. By configuring the projection optical system such that the value of TL21/|f| is not greater than or equal to the upper limit defined in Conditional Formula (2), the lens length of the first lens group G21 can be prevented from becoming excessively long, and miniaturization can be achieved. By configuring the projection optical system such that the value of TL21/|f| is not less than or equal to the lower limit defined in Conditional Formula (2), the distance between the first optical path bending means R1 and the second optical path bending means R2 can be prevented from becoming excessively small. As a result, the possibility of interference can be eliminated. Note that more favorable properties can be obtained if Conditional Formula (1-1) and/or Conditional Formula (2-1) below are satisfied.

$$10.0 < TL1/|f| < 50.0 \tag{1}$$

$$15.0 TL1/|f| < 40.0 \tag{1-1}$$

$$4.0 TL2/|f| < 30.0 \tag{2}$$

$$6.0 TL2/|f| < 20.0 \tag{2-1}$$

wherein TL1 is the distance along the optical axis from the surface most toward the reduction side to the surface most toward the magnification side within the first optical system, TL21 is the distance along the optical axis from the surface most toward the reduction side to the surface most toward the magnification side within the first lens group, and f is the focal length of the entire projection optical system.

In the projection optical system of the present embodiment, it is preferable for Conditional Formulae (3) and (4) below to be satisfied. Conditional Formula (3) defines the ratio between the distance between the first optical system G1 and the second optical system G2, and the focal length of the entire projection optical system. By configuring the projection optical system such that the value of D12/|f| is not greater than or equal to the upper limit defined in Conditional Formula (3), the distance between the first optical system G1 and the second optical system G2 can be prevented from becoming excessively great, and miniaturization can be achieved. By configuring the projection optical system such that the value of D12/|f| is not less than or equal to the lower limit defined in Conditional Formula (3), a sufficient amount of space for placing the first optical path bending means R1 can be secured. As a result, the probability of foreign matter, damage, etc. on the first optical path bending means R1 being projected onto a screen can be reduced. Conditional Formula (4) defines the ratio between the distance between the first lens group G21 and the second lens group G22 and the focal length of the entire projection system. By configuring the projection optical system such that the value of D212/|f| is not greater than or equal to the upper limit defined in Conditional Formula (4), the distance between the first lens group G21 and the second lens group G22 can be prevented from becoming excessively great, and miniaturization can be achieved. By configuring the projection optical system such that the value of D212/|f| is not less than or equal to the lower limit defined in Conditional Formula (4), a sufficient amount of space for placing the second optical path bending means R2 can be secured. Note that more favorable properties can be obtained if Conditional Formula (3-1) and/or Conditional Formula (4-1) below are satisfied.

$$8.0 < D12/|f| < 30.0 \tag{3}$$

$$10.0 < D12/|f| < 25.0 \tag{3-1}$$

$$5.0 < D212/|f| < 20.0 \tag{4}$$

$$6.0 < D212/|f| < 15.0 \tag{4-1}$$

wherein D12 is the distance along the optical axis between the first optical system and the second optical system, D212 is the distance along the optical axis between the first lens group and the second lens group, and f is the focal length of the entire projection optical system.

In addition, it is preferable for Conditional Formula (5) below to be satisfied. Conditional Formula (5) defines the ratio between the focal length of the second optical system G2 and the focal length of the entire projection optical system. This ratio corresponds to the relay magnification rate of the first optical system G1 that forms the intermediate image. By Conditional Formula (5) being satisfied, a relay magnification rate can be appropriately set in order to achieve a wide angle of view by the relay method. As a result, it becomes possible to achieve a widening of the angle of view, while appropriately correcting various aberrations which become problems when widening the angle of view. By configuring the projection optical system such that the value of f2/|f| is not greater than or equal to the upper limit defined in Conditional Formula (5), the relay magnification rate, and therefore the size of the intermediate image, can be prevented from increasing. As a result, increases in the diameters of the lenses within the second optical system G2 can be prevented. In addition, correction of distortion and field curvature in the second optical system G2 can be facilitated. The FNo. required of the second optical system G2 is the FNo. of the entire projection optical system multiplied by the relay magnification rate. By configuring the projection optical system such that the value of f2/|f| is not less than or equal to the lower limit defined in Conditional Formula (5), the F value (FNo.) required of the second optical system G2 can be prevented from becoming excessively small. As a result, correction of aberrations (particularly spherical aberration and astigmatism) corresponding to a widened angle of view and a fast lens having a small F value is facilitated. Note that more favorable properties can be obtained if Conditional Formula (5-1) below is satisfied.

$$1.50 < f2/|f| < 2.80 \tag{5}$$

$$1.52 < f2/|f| < 2.20 \tag{5-1}$$

wherein f2 is the focal length of the second optical system, and f is the focal length of the entire projection optical system.

In addition, it is preferable for Conditional Formula (6) below to be satisfied. Conditional Formula (6) defines the relationship among the effective image diameter at the reduction side, the focal length of the second optical system G2, and the focal length of the entire projection optical system. By configuring the projection optical system such that the value of $Im\varphi \cdot f2/f^2$ is not greater than or equal to the upper limit defined in Conditional Formula (6), the effective image diameter can be prevented from becoming excessively great with respect to the focal length of the entire projection optical system, and the power of the second optical system G2 can be prevented from becoming excessively weak with respect to the focal length of the entire projection optical system. As a result, the diameters of the lenses of the second optical system G2 can be decreased, and the entire projection optical system can be miniaturized. By configuring the projection optical system such that the value of $Im\varphi \cdot f2/f^2$ is not less than or equal to the lower limit defined in Conditional Formula (6), the effective image diameter can be prevented from becoming excessively small with respect to the focal length of the entire projection optical system, and the power of the second optical system G2 can be prevented from becoming excessively strong with respect to the focal length of the entire projection optical system. As a result, the requirements for the second optical system G2 to correct aberrations (particularly spherical aberration and astigmatism) are lessened, and realizing high performance is facilitated. Note that more favorable properties can be obtained if Conditional Formula (6-1) below is satisfied.

$$8.20 < Im\varphi \cdot f2/f^2 < 20.00 \tag{6}$$

$$8.30 < Im\varphi \cdot f2/f^2 < 16.00 \tag{6-1}$$

wherein Imφ is the effective image diameter at the reduction side, f2 is the focal length of the second optical system, and f is the focal length of the entire projection optical system.

In addition, it is preferable for Conditional Formula (7) below to be satisfied. Conditional Formula (7) defines the ratio between the distance along the optical axis from the surface most toward the magnification side in the second optical system G2 to the position of an entrance pupil in the case that the magnification side is a light entry side and the total length of the second optical system G2. In an ordinary optical system that does not form an intermediate image, it is necessary to secure a long back focus. However, it is not necessary to secure a long back focus for the second optical system G2 in the present embodiment because an intermediate image is formed. Therefore, it is possible to move the position of the entrance pupil more toward the magnification side compared to an ordinary optical system that does not form an intermediate image, and a widening of the angle of view can be achieved while decreasing the diameter of the lens most toward the magnification side within the second optical system G2. Conditional Formula (7) defines the ratio that enables this state to be achieved. By configuring the projection optical system such that the value of enP/TL2 is not greater than or equal to the upper limit defined in Conditional Formula (7), the position of the entrance pupil can be moved more toward the magnification side, and securing a desired angle of view is facilitated. By configuring the projection optical system such that the value of enP/TL2 is not less than or equal to the lower limit defined in Conditional Formula (7), the total length of the second optical system G2 can be prevented from becoming excessively long, while suppressing an increase in the diameter of the lens most toward the magnification side within the second optical system G2. Note that more favorable properties can be obtained if Conditional Formula (7-1) below is satisfied.

$$0.020 < enP/TL2 < 0.160 \tag{7}$$

$$0.050 < enP/TL2 < 0.145 \tag{7-1}$$

wherein enP is the distance along the optical axis from the surface most toward the magnification side in the second optical system to the position of an entrance pupil in the case that the magnification side is a light entry side, and TL2 is the distance along the optical axis from the surface most toward the reduction side in the second optical system.

In addition, it is preferable for Conditional Formula (8) below to be satisfied. Conditional Formula (8) defines the ratio between the effective image diameter at the reduction side and the total length of the second optical system G2. By configuring the projection optical system such that the value of Imφ/TL2 is not greater than or equal to the upper limit defined in Conditional Formula (8), increases in the sensitivity to error of individual lenses within the second optical system G2 due to excessive miniaturization can be suppressed, and productivity can be maintained. By configuring the projection optical system such that the value of Imφ/TL2 is not less than or equal to the lower limit defined in Conditional Formula (8), a desired effective image diameter can be obtained, while the total length of the second optical system G2 can be prevented from becoming excessively great. Note that more favorable properties can be obtained if Conditional Formula (8-1) below is satisfied.

$$0.125 < Im\varphi/TL2 < 0.240 \tag{8}$$

$$0.130 < Im\varphi/TL2 < 0.200 \tag{8-1}$$

wherein Imφ is the effective image diameter at the reduction side, and TL2 is the distance along the optical axis from the surface most toward the reduction side in the second optical system.

In addition, it is preferable for Conditional Formula (9) below to be satisfied. Conditional Formula (9) defines the ratio between the focal lengths of the first lens group G21 and the second lens group G22 within the second optical system G2. By configuring the projection optical system such that the value of f22/f21 is not greater than or equal to the upper limit defined in Conditional Formula (9), the power of the first lens group G21 will be prevented from becoming excessively strong with respect to that of the second lens group G22. As a result, the incident angles of light that enters the first optical system G1 can be prevented from becoming excessively great, and correcting aberrations in the first optical system G1 will be facilitated. By configuring the projection optical system such that the value of f22/f21 is not less than or equal to the lower limit defined in Conditional Formula (9), the power of the second lens group G22 will be prevented from becoming excessively strong with respect to that of the first lens group G21. As a result, correcting distortion in the second lens group G22 will be facilitated. Note that more favorable properties can be obtained if Conditional Formula (9-1) below is satisfied.

$$0.30 < f22/f21 < 2.00 \qquad (9)$$

$$0.40 < f22/f21 < 1.70 \qquad (9\text{-}1)$$

wherein f21 is the focal length of the first lens group, and f22 is the focal length of the second lens group.

In addition, it is preferable for Conditional Formula (10) below to be satisfied. Conditional Formula (10) defines the back focus of the entire projection optical system, and sets a sufficient back focus necessary for a space to provide a color combining prism and the like at the reduction side of the entire projection optical system. By configuring the projection optical system such that the value of Bf/|f| is not less than or equal to the lower limit defined in Conditional Formula (10), the back focus can be prevented from becoming excessively short. As a result, providing a color combining prism and the like is facilitated. Note that more favorable properties can be obtained if Conditional Formula (10-1) below is satisfied. By configuring the projection optical system such that the value of Bf/|f| is not greater than or equal to the upper limit defined in Conditional Formula (10-1), the back focus can be prevented from becoming excessively long, and therefore miniaturization can be achieved.

$$4.0 < Bf/|f| \qquad (10)$$

$$5.0 < Bf/|f| < 20.0 \qquad (10\text{-}1)$$

wherein Bf is the back focus of the entire projection optical system (an air converted length), and f is the focal length of the entire projection optical system.

In addition, it is preferable for a principal light ray at the maximum angle of view and the optical axis of the second optical system G2 to intersect between the first lens group G21 and the second lens group G22. The size of the second optical path bending means R2 which is provided in the second optical system can be miniaturized by adopting such a configuration.

In addition, the intermediate image may be configured such that the peripheral portion has more field curvature toward the first optical system than the portion thereof at the center of the optical axis. In this manner, by keeping distortion, astigmatism, and the like in the first optical system G1 and canceling these aberrations in the second optical system G2 instead of correcting aberrations in the first optical system G1 and the second optical system G2 independently, it becomes possible to favorably correct various aberrations even with a small number of lenses while achieving a widening of the angle of view.

In addition, it is preferable for the first optical path bending means and/or the second optical path bending means to be a mirror. By employing mirrors in this manner, light loss due to the transmissivity of members will not occur, heat will influence the optical path bending means less, and the optical path bending means can be formed to be lightweight, when compared to a case in which prisms are employed. For these reasons, employing mirrors is advantageous from the viewpoints of properties and productivity in the case that each of the optical path bending means is configured to perform horizontal reflection or vertical reflection.

In addition, it is preferable for the first optical path bending means and/or the second optical path bending means to be provided to bend the optical path 90 degrees. By adopting such a configuration, miniaturization of the projection optical system as a whole can be efficiently achieved.

In addition, it is preferable for images which are displayed by the image display elements to be projected as magnified images which are inverted by 180 degrees. By adopting such a configuration, the size of the system as a whole that includes a screen and the projection optical system can be miniaturized.

Next, examples of numerical values of the projection optical system of the present disclosure will be described.

First, the projection optical system according to Example 1 will be described. FIG. 1 is a sectional diagram that illustrates the configuration of the projection optical system according to Example 1. Note that in FIG. 1 and in FIGS. 2 through 7 that correspond to Examples 2 through 7 to be described later, the side of the image display surface Sim is the reduction side, and the side of a final lens L32 (a final lens L34 only in Example 5) within the second optical system is the magnification side. The aperture stops St illustrated in the drawings do not necessarily represent the sizes or shapes thereof, but the positions thereof along the optical axis Z. In addition, FIGS. 1 through 7 also show axial light beams wa and light beams wb at a maximum angle of view.

The projection optical system according to Example 1 is constituted by, in order from the reduction side to the magnification side, the first optical system G1, the first optical path bending means R1, and the second optical system G2. The first optical system G1 is constituted by ten lenses, which are lenses L1 through L10, and the second optical system G2 is constituted by twelve lenses, which are lenses L21 through L32. In addition, the second optical system G2 is constituted by, in order from the reduction side to the magnification side, the first lens group G21, the second optical path bending means R2, and the second lens group G22. The first lens group G21 is constituted by six lenses, which are lenses L21 through L26, and the second lens group G22 is constituted by six lenses, which are lenses L27 through L32.

Basic lens data of the projection optical system according to Example 1 are shown in Table 1, data related to various items are shown in Table 2, and data related to aspherical surface coefficients are shown in Table 3. The meanings of the symbols in the tables will be described with those related to Example 1 as an example. However, they are basically same for Examples 2 through 7 as well.

In the lens data of Table 1, surface numbers that sequentially increase from the magnification side to the reduction side, with the surface toward the magnification side of the constituent element at the most magnification side designated as first, are shown in the column "Surface Number". The radii of curvature of each of these surfaces are shown in the column "Radius of Curvature". The distances between each surface and a next surface are shown in the column "Distance". The refractive indices with respect to the d line (wavelength: 587.6 nm) of each of the optical elements are shown in the column "nd". The Abbe's numbers of each of the optical elements with respect to the d line (wavelength: 587.6 nm) are shown in the column "vd". Here, the signs of the radii of curvature are positive in cases that the surface shape is convex toward the object side, and negative in cases that the surface shape is convex toward the image side. Table 1 also shows the aperture stop St and the optical member PP. Text reading "(stop)" is shown along with the surface number in the row in the column of surface numbers corresponding to the surface of the aperture stop St.

The values of the focal length f, the back focus Bf, the F value FNo., and the full angle of view 2ω are shown as data related to various items in Table 2.

Note that the numerical values of the basic lens data and the data related to various items are those which are normalized such that the absolute value of the focal length of the entire projection optical system becomes 1. In addition, the numerical values in each of the tables are rounded off at a predetermined number of digits.

In the lens data of Table 1, an "*" is indicated along with the surface numbers of aspherical surfaces, and numerical values related to the paraxial radii of curvature are shown in the column that shows the radii of curvature for the aspherical surfaces. The data related to aspherical surface coefficients of Table 3 shows the surface numbers of the aspherical surfaces and aspherical surface coefficients related to the aspherical surfaces. The aspherical surface coefficients are the coefficients KA and Am (m=3~17) represented by the aspherical surface shape formula below.

$$Zd = \frac{C \times h^2}{1 + \sqrt{1 - KA \times C^2 \times h^2}} + \sum_m Am \times h^m$$

wherein: Zd is the depth of the aspherical surface (the length of a normal line from a point on an aspherical surface at a height h to a plane perpendicular to the optical axis that contacts the peak of the aspherical surface), h is the height (the distance from the optical axis to the surface of the lens), C is the paraxial curvature, and KA and Am are aspherical surface coefficients (m=3~17).

TABLE 1

Example 1: Lens Data

| Surface Number | Radius of Curvature | Distance | nd | vd |
|---|---|---|---|---|
| *1 | −6.0454 | 0.7622 | 1.49100 | 57.58 |
| *2 | −23.1701 | 0.8901 | | |
| 3 | 17.2456 | 0.5145 | 1.80610 | 40.93 |
| 4 | 5.6254 | 1.3385 | | |
| 5 | 9.4485 | 0.3810 | 1.80610 | 33.27 |
| 6 | 4.4487 | 2.4299 | | |
| 7 | −13.0249 | 0.3047 | 1.77250 | 49.60 |
| 8 | 7.9549 | 3.5242 | | |
| 9 | 37.3401 | 3.8111 | 1.64769 | 33.79 |
| 10 | −9.8610 | 0.3711 | | |
| 11 | 12.3243 | 0.8198 | 1.80518 | 25.42 |
| 12 | 49.0021 | 8.7225 | | |

TABLE 1-continued

Example 1: Lens Data

| Surface Number | Radius of Curvature | Distance | nd | vd |
|---|---|---|---|---|
| 13 | ∞ | 0.0000 | Second optical path bending means | |
| 14 | ∞ | 3.8110 | | |
| 15 | 41.0416 | 0.2494 | 1.80518 | 25.42 |
| 16 | 5.6876 | 2.2334 | 1.59282 | 68.62 |
| 17 | −8.3664 | 0.0379 | | |
| 18 | 11.0541 | 2.4421 | 1.72916 | 54.68 |
| 19 | −4.7277 | 0.4579 | 1.80518 | 25.42 |
| 20 | 13.4072 | 1.8900 | | |
| *21 | 20.2550 | 0.9529 | 1.51007 | 56.24 |
| *22 | 1984.7652 | 2.3243 | | |
| 23 | 156.9733 | 1.4636 | 1.80518 | 25.42 |
| 24 | −11.3871 | 13.6810 | | |
| 25 | ∞ | 0.0000 | First Optical path bonding means | |
| 26 | ∞ | 3.6204 | | |
| *27 | −6.4082 | 0.9529 | 1.49100 | 57.58 |
| *28 | −6.4862 | 0.0952 | | |
| 29 | −23.8508 | 0.4307 | 1.80518 | 25.42 |
| 30 | 14.6943 | 3.7034 | 1.77250 | 49.60 |
| 31 | −13.4010 | 0.0379 | | |
| 32 | 14.1100 | 2.2807 | 1.77250 | 49.60 |
| 33 | −47.6613 | 3.1484 | | |
| 34 | 6.6271 | 1.1795 | 1.80400 | 46.58 |
| 35 | 25.2352 | 0.2383 | 1.51742 | 52.43 |
| 36 | 3.4758 | 3.9425 | | |
| 37 (stop) | ∞ | 0.3237 | | |
| 38 | −3.4327 | 0.1923 | 1.80518 | 25.42 |
| 39 | 6.5801 | 0.9770 | 1.59282 | 68.62 |
| 40 | −4.1078 | 2.6800 | | |
| 41 | −41.8171 | 1.3861 | 1.51633 | 64.14 |
| 42 | −5.2781 | 0.0379 | | |
| 43 | 9.7434 | 1.2004 | 1.80518 | 25.42 |
| 44 | −59.6891 | 3.3573 | | |
| 45 | ∞ | 4.7637 | 1.51633 | 64.14 |
| 46 | ∞ | | | |

Second optical path bending means positioned at 4.9115 toward the reduction side from the 12th surface
First optical path bending means positioned at 10.0606 toward the reduction side from the 22nd surface

TABLE 2

Example 1: Items (d line)

| | |
|---|---|
| f | −1.00 |
| Bf | 6.50 |
| FNo. | 2.00 |
| 2ω [°] | 137.4 |

TABLE 3

Example 1: Aspherical Surface Coefficients

| | Surface Number | | |
|---|---|---|---|
| | 1 | 2 | 21 |
| KA | −8.5831337E−01 | 1.5267730E+00 | 1.0000000E+00 |
| A3 | 1.3500124E−02 | 1.6207700E−02 | 0.0000000E+00 |
| A4 | 3.7355108E−03 | −1.5811440E−03 | 7.2756257E−03 |
| A5 | −1.5958047E−03 | −2.6343865E−05 | −1.1125847E−03 |
| A6 | 1.6144623E−04 | 4.6257457E−05 | −4.3853690E−04 |
| A7 | 1.9376746E−05 | −9.1010163E−06 | −9.6686212E−05 |
| A8 | −5.4169501E−06 | −1.1093364E−07 | −1.2964384E−06 |
| A9 | 7.3993426E−08 | 2.0922090E−07 | 3.4086512E−05 |
| A10 | 8.4962283E−08 | −1.0107572E−08 | −2.7066187E−06 |
| A11 | −6.8422640E−09 | −2.0627751E−09 | −3.3282322E−06 |
| A12 | −4.7910538E−10 | 1.4750183E−10 | 4.6361979E−07 |

TABLE 3-continued

Example 1: Aspherical Surface Coefficients

| A13 | 7.9463074E−11 | 9.8397311E−12 | 1.5667589E−07 |
|---|---|---|---|
| A14 | −7.6995814E−13 | −8.1234981E−13 | −2.1732042E−08 |
| A15 | −2.9134071E−13 | −1.8967333E−14 | −3.6501692E−09 |
| A16 | 1.1711185E−14 | 1.5857063E−15 | 3.3018889E−10 |
| A17 | — | — | 3.3724534E−11 |

| | Surface Number | | |
|---|---|---|---|
| | 22 | 27 | 28 |
| KA | 1.0000000E+00 | 1.0000000E+00 | 1.0000000E+00 |
| A3 | 1.1570968E−18 | 1.4379200E−18 | 0.0000000E+00 |
| A4 | 1.1017431E−02 | 1.5339083E−03 | 1.0017244E−03 |
| A5 | 6.3653027E−04 | −1.5364843E−04 | 1.6329654E−04 |
| A6 | −1.5459887E−03 | 7.5849186E−05 | −1.1437954E−04 |
| A7 | −6.7282664E−05 | 6.4644403E−05 | 7.8011554E−05 |
| A8 | 1.4511524E−04 | −3.0470719E−05 | −9.1645167E−06 |
| A9 | −1.3328630E−05 | −1.8064302E−06 | −6.8267502E−06 |
| A10 | −8.8345669E−06 | 2.5038294E−06 | 1.8502503E−06 |
| A11 | 2.4349490E−06 | −1.5479839E−07 | 1.6669133E−07 |
| A12 | 2.9922618E−07 | −9.3616561E−08 | −1.0039622E−07 |
| A13 | −1.5541144E−07 | 1.1174150E−08 | 2.8772081E−09 |
| A14 | −3.4183472E−08 | 1.6690407E−09 | 2.3388596E−09 |
| A15 | 4.5654529E−09 | −2.6272163E−10 | −1.8625879E−10 |
| A16 | −2.6343230E−11 | −1.1361384E−11 | −2.0187141E−11 |
| A17 | −5.2171013E−11 | 2.1681971E−12 | 2.1924717E−12 |

Figure 8:
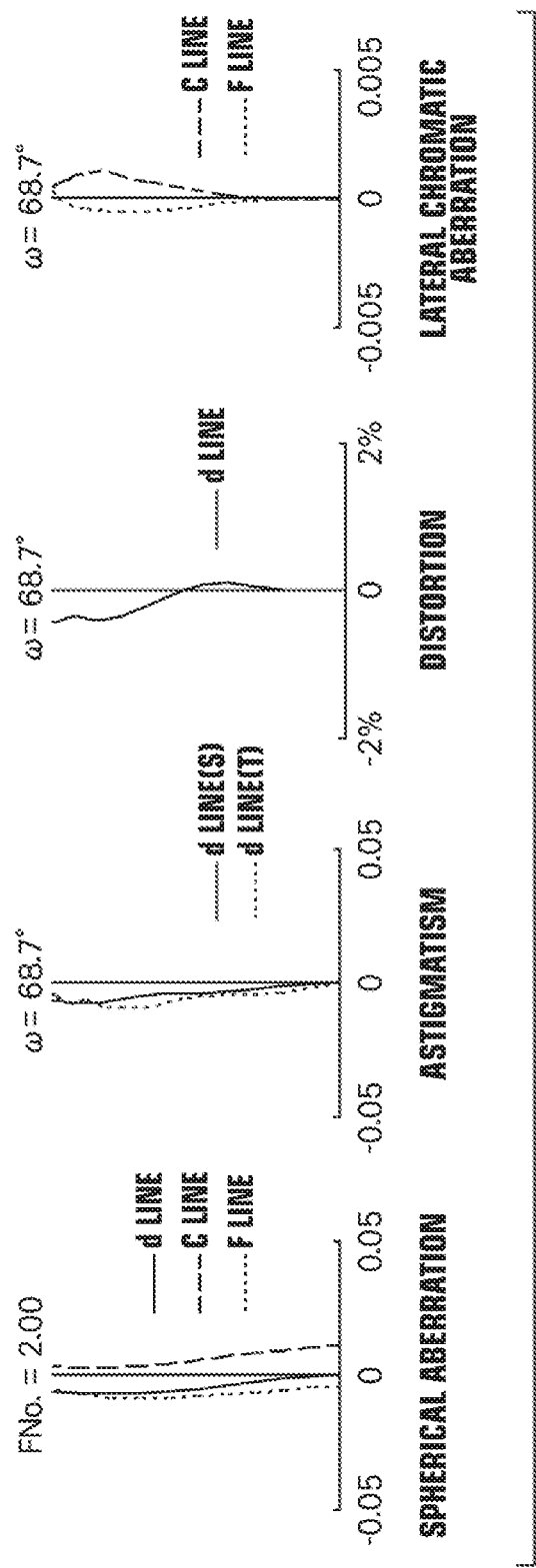
FIG. 8 is a collection of diagrams that illustrate aberrations of the projection optical system of Example 1.

Diagrams that illustrate various aberrations of the projection optical system according to Example 1 are illustrated in FIG. 8. The spherical aberration, the astigmatism, the distortion, and the lateral chromatic aberration are illustrated in order from the left side of the drawing sheet of FIG. 8. The diagrams that illustrate spherical aberration, astigmatism, and distortion show aberrations that have the d line (wavelength: 587.6 nm) as a reference wavelength. The diagram that illustrates spherical aberration shows aberrations related to the d line (wavelength: 587.6 nm), the C line (wavelength: 656.3 nm), and the F line (wavelength: 486.1 nm) indicated by a solid line, a long broken line, and a short broken line, respectively. In the diagrams that illustrate astigmatism, aberrations related to the d line in the sagittal direction and the tangential direction are indicated by a solid line and a short broken line, respectively. In the diagram that illustrates lateral chromatic aberration, aberrations related to the C line (wavelength: 656.3 nm) and the F line (wavelength: 486.1 nm) are indicated by a long broken line and a short broken line, respectively. In the diagrams that illustrate spherical aberration, "FNo." denotes F numbers, and in the diagrams that illustrate other aberrations, "ω" denotes half angles of view.

Note that the numerical values shown in the basic lens data and the data related to various items as well as the diagrams that illustrate aberrations are all those for a finite projection distance. The data related to Example 1 are those for a case in which the projection distance is 121.950.

The symbols, meanings, and the manner in which each type of data are shown in the description of Example 1 above are the same for the following Examples unless particularly noted. Therefore, redundant descriptions will be omitted below.

Figure 2:
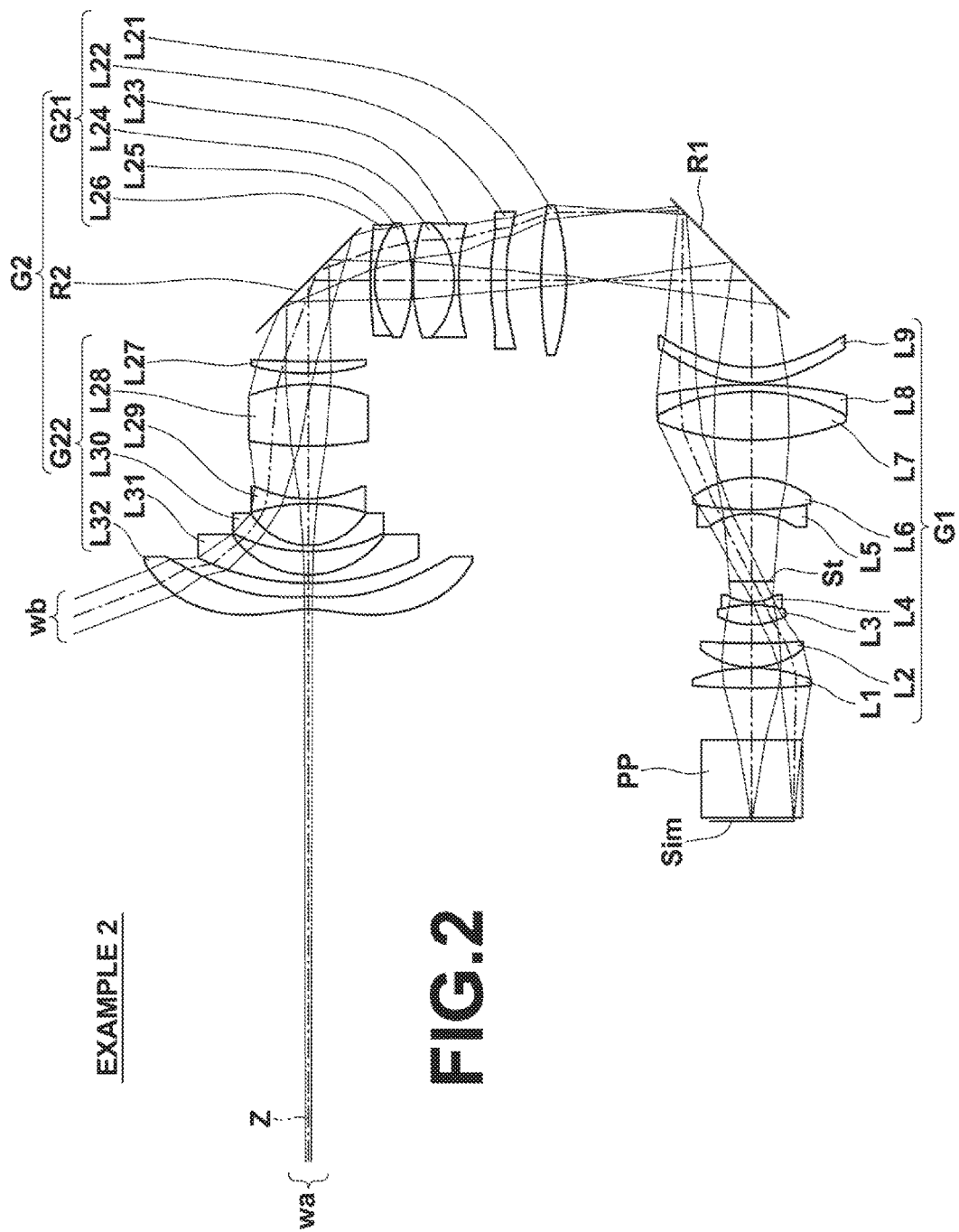
FIG. 2 is a sectional diagram that illustrates the configuration of a projection optical system according to Example 2 of the present disclosure.
Figure 9:
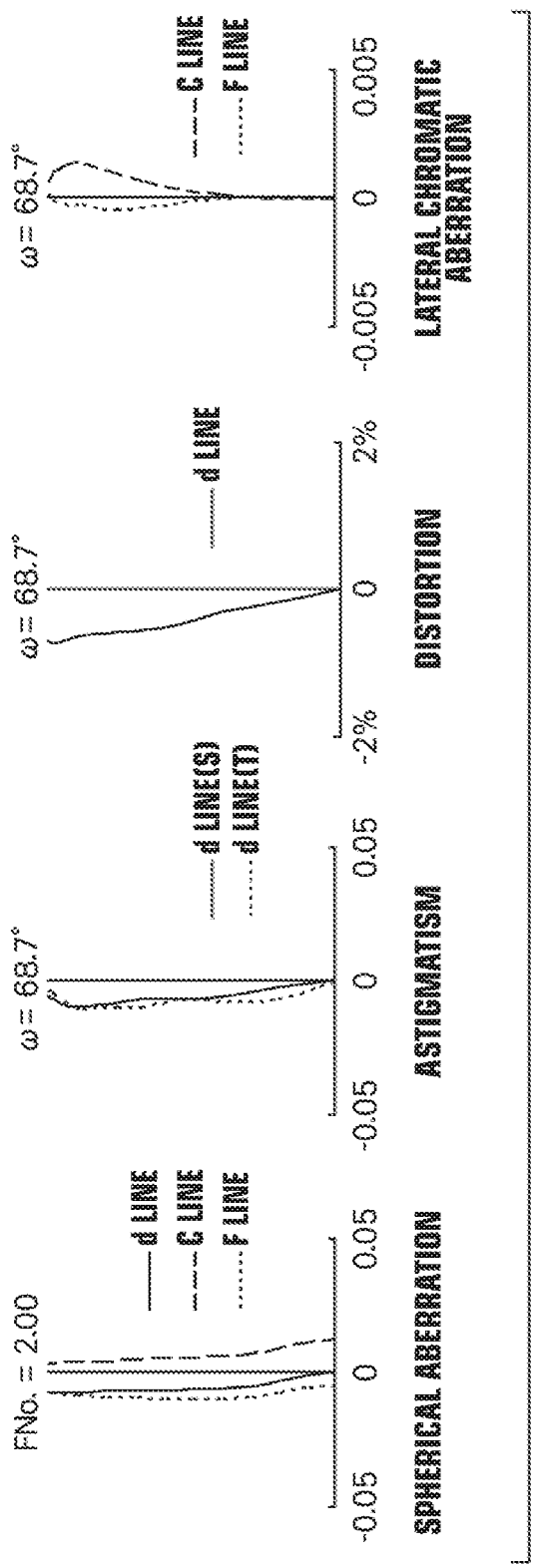
FIG. 9 is a collection of diagrams that illustrate aberrations of the projection optical system of Example 2.

Next, a projection optical system according to Example 2 will be described. FIG. 2 is a sectional diagram that illustrates the configuration of the projection optical system according to Example 2. The projection optical system according to Example 2 is the same as that according to Example 1, except that a first optical system G1 is constituted by nine lenses, which are lenses L1 through L9. In addition, basic lens data are shown in Table 4, data related to various items are shown in Table 5, data related to aspherical surface coefficients are shown in Table 6, and diagrams that illustrate aberrations are illustrated in FIG. 9 for the projection optical system according to Example 2. For Example 2, data are shown for a case in which the projection distance is 121.933.

TABLE 4

Example 2: Lens Data

| Surface Number | Radius of Curvature | Distance | nd | vd |
|---|---|---|---|---|
| *1 | −5.8925 | 0.7620 | 1.49100 | 57.58 |
| *2 | −20.1570 | 0.8369 | | |
| 3 | 15.5565 | 0.5142 | 1.80610 | 33.27 |
| 4 | 5.6978 | 1.4192 | | |
| 5 | 10.0304 | 0.3809 | 1.80400 | 46.58 |
| 6 | 4.1382 | 2.5409 | | |
| 7 | −11.8212 | 0.3047 | 1.69680 | 55.53 |
| 8 | 7.4250 | 3.2265 | | |
| 9 | 21.6797 | 3.8106 | 1.62588 | 35.70 |
| 10 | −9.6963 | 0.6623 | | |
| 11 | 13.0592 | 0.7299 | 1.80518 | 25.42 |
| 12 | 45.3570 | 8.7778 | | |
| 13 | ∞ | 0.0000 | Second optical path bending means | |
| 14 | ∞ | 3.8104 | | |
| 15 | 29.4001 | 0.2494 | 1.80518 | 25.42 |
| 16 | 5.7492 | 2.3083 | 1.59282 | 68.62 |
| 17 | −8.9476 | 0.0379 | | |
| 18 | 10.9153 | 2.5665 | 1.72916 | 54.68 |
| 19 | −4.9491 | 0.2761 | 1.80518 | 25.42 |
| 20 | 13.1774 | 1.9787 | | |
| *21 | 37.8174 | 0.9528 | 1.51007 | 56.24 |
| *22 | −42.8078 | 2.1168 | | |
| 23 | 28.9497 | 1.5439 | 1.80518 | 25.42 |
| 24 | −15.3485 | 11.3838 | | |
| 25 | ∞ | 0.0000 | First optical path bending means | |
| 26 | ∞ | 5.3346 | | |
| *27 | −6.8136 | 0.9524 | 1.49100 | 57.58 |
| *28 | −6.3119 | 0.0953 | | |
| 29 | 26.6794 | 0.4304 | 1.80518 | 25.42 |
| 30 | 11.9638 | 2.9976 | 1.80400 | 46.58 |
| 31 | −15.6135 | 2.2913 | | |
| 32 | 6.2479 | 1.9616 | 1.79952 | 42.22 |
| 33 | −19.3391 | 0.2380 | 1.75520 | 27.51 |
| 34 | 4.7254 | 4.1465 | | |
| 35 (stop) | ∞ | 1.2584 | | |
| 36 | −2.9686 | 0.1922 | 1.69895 | 30.13 |
| 37 | 7.6474 | 1.1974 | 1.49700 | 81.54 |
| 38 | −4.5534 | 1.1333 | | |
| 39 | −56.3920 | 1.5180 | 1.51633 | 64.14 |
| 40 | −4.8487 | 0.0379 | | |
| 41 | 9.8891 | 1.2337 | 1.80518 | 25.42 |
| 42 | −43.9166 | 3.3192 | | |
| 43 | ∞ | 4.7630 | 1.51633 | 64.14 |
| 44 | ∞ | | | |

Second optical path bending means positioned at 4.9674 toward the reduction side from the 12th surface
First optical path bending means positioned at 11.3838 toward the reduction side from the 22nd surface

TABLE 5

Example 2: Items (d line)

| f | −1.00 |
|---|---|
| Bf | 6.50 |
| FNo. | 2.00 |
| 2ω [°] | 137.4 |

TABLE 6

Example 2: Aspherical Surface Coefficients

| | Surface Number | | |
|---|---|---|---|
| | 1 | 2 | 21 |
| KA | −9.1567984E−01 | 1.4161570E+00 | 1.0000000E+00 |
| A3 | 1.2952037E−02 | 1.5904415E−02 | 0.0000000E+00 |
| A4 | 3.9150390E−03 | −1.3949854E−03 | 9.3942194E−03 |
| A5 | −1.5698458E−03 | 4.4581928E−05 | −1.4325021E−03 |
| A6 | 1.5067101E−04 | 3.6644074E−05 | −7.4380791E−04 |
| A7 | 1.9408238E−05 | −1.1288892E−05 | 4.8872772E−05 |
| A8 | −5.1447424E−06 | 9.4146166E−08 | 1.0656305E−05 |
| A9 | 5.4632195E−08 | 2.4324539E−07 | 1.0315634E−05 |
| A10 | 8.1696007E−08 | −1.2116421E−08 | −5.7754042E−07 |
| A11 | −6.3994138E−09 | −2.3676359E−09 | −1.3572625E−06 |
| A12 | −4.6802337E−10 | 1.5599848E−10 | 1.7149721E−07 |
| A13 | 7.5394399E−11 | 1.1315205E−11 | 6.9656284E−08 |
| A14 | −6.7157046E−13 | −8.1910668E−13 | −8.7243284E−09 |
| A15 | −2.7762688E−13 | −2.1842079E−14 | −1.7008941E−09 |
| A16 | 1.1039658E−14 | 1.5599543E−15 | 1.3147816E−10 |
| A17 | — | — | 1.6357442E−11 |

| | Surface Number | | |
|---|---|---|---|
| | 22 | 27 | 28 |
| KA | 1.0000000E+00 | 1.0000000E+00 | 1.0000000E+00 |
| A3 | 0.0000000E+00 | 0.0000000E+00 | 0.0000000E+00 |
| A4 | 1.3217033E−02 | 1.0973771E−03 | 7.2353797E−04 |
| A5 | −3.8764052E−05 | −1.6119120E−04 | 3.1890659E−04 |
| A6 | −1.3457239E−03 | 9.2374493E−05 | −2.1155652E−04 |
| A7 | −2.5284883E−05 | 2.6448831E−05 | 8.5393245E−05 |
| A8 | 5.9734739E−05 | −2.2364856E−05 | −9.6262302E−07 |
| A9 | −3.4756794E−07 | 1.0647077E−06 | −9.5399408E−06 |
| A10 | 1.0993936E−07 | 1.4823302E−06 | 1.9030259E−06 |
| A11 | 2.3308460E−07 | −2.0231799E−07 | 3.2394660E−07 |
| A12 | −1.3176092E−07 | −4.5293765E−08 | −1.2798209E−07 |
| A13 | −1.4357380E−08 | 8.8634300E−09 | 3.6171844E−10 |
| A14 | 5.8120548E−09 | 6.4024409E−10 | 3.3681773E−09 |
| A15 | 3.6457202E−10 | −1.6537919E−10 | −2.1991630E−10 |
| A16 | −8.6133307E−11 | −3.1465255E−12 | −3.1913698E−11 |
| A17 | −3.5469901E−12 | 1.1501260E−12 | 3.1394043E−12 |

Figure 3:
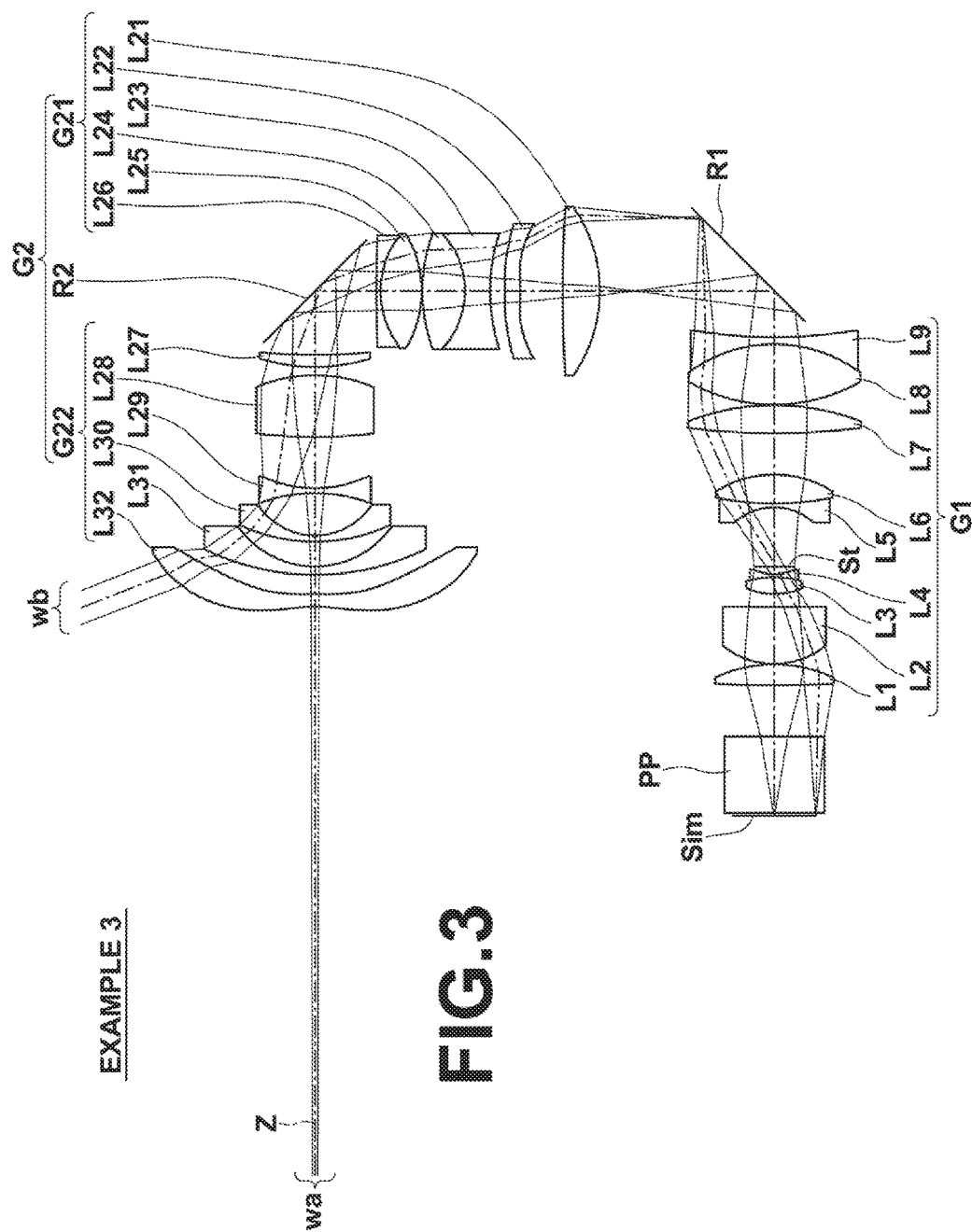
FIG. 3 is a sectional diagram that illustrates the configuration of a projection optical system according to Example 3 of the present disclosure.
Figure 10:
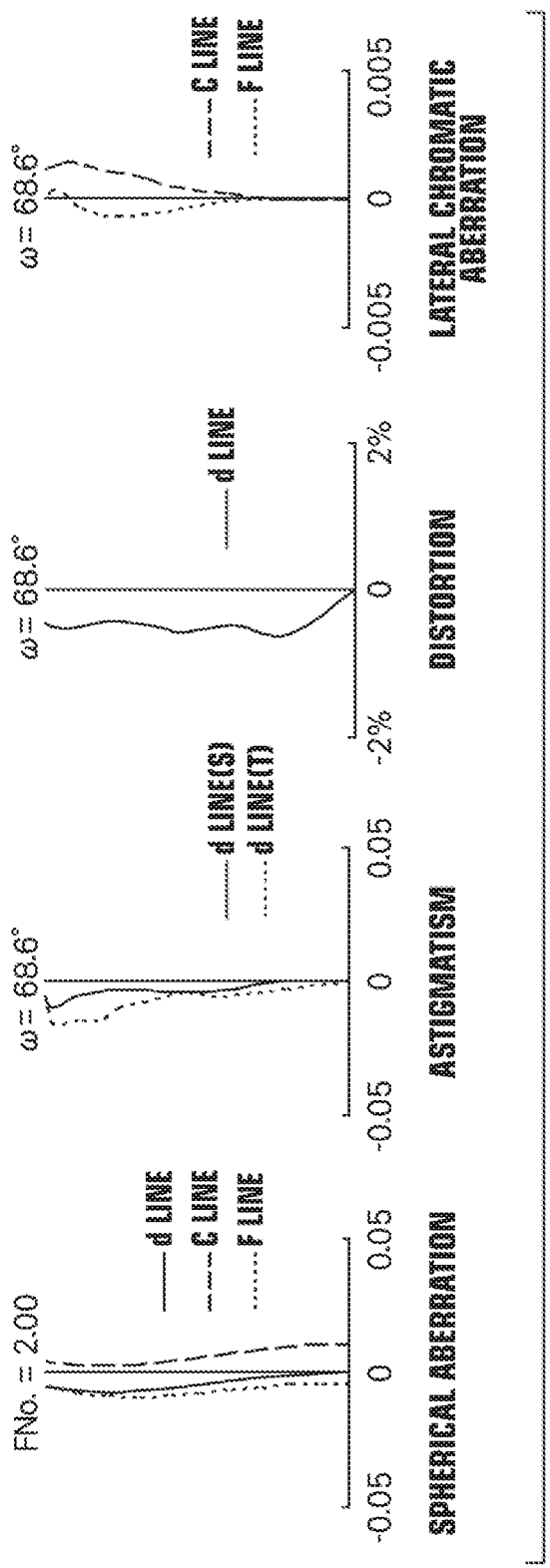
FIG. 10 is a collection of diagrams that illustrate aberrations of the projection optical system of Example 3.

Next, a projection optical system according to Example 3 will be described. FIG. 3 is a sectional diagram that illustrates the configuration of the projection optical system according to Example 3. The projection optical system according to Example 3 is the same as that according to Example 1, except that a first optical system G1 is constituted by nine lenses, which are lenses L1 through L9. In addition, basic lens data are shown in Table 7, data related to various items are shown in Table 8, data related to aspherical surface coefficients are shown in Table 9, and diagrams that illustrate aberrations are illustrated in FIG. 10 for the projection optical system according to Example 3. For Example 3, data are shown for a case in which the projection distance is 121.682.

TABLE 7

Example 3: Lens Data

| Surface Number | Radius of Curvature | Distance | nd | νd |
|---|---|---|---|---|
| *1 | −5.9537 | 0.7607 | 1.49100 | 57.58 |
| *2 | −22.4102 | 1.1909 | | |
| 3 | 15.5182 | 0.5135 | 1.77250 | 49.60 |
| 4 | 5.7832 | 1.5272 | | |
| 5 | 10.9610 | 0.3801 | 1.77250 | 49.60 |
| 6 | 4.1302 | 2.6498 | | |
| 7 | −9.7742 | 0.3044 | 1.58913 | 61.13 |
| 8 | 7.6108 | 3.1655 | | |
| 9 | 31.3501 | 3.8027 | 1.60342 | 38.03 |

TABLE 7-continued

Example 3: Lens Data

| Surface Number | Radius of Curvature | Distance | nd | νd |
|---|---|---|---|---|
| 10 | −9.3384 | 0.5129 | | |
| 11 | 11.5048 | 0.7443 | 1.80518 | 25.42 |
| 12 | 37.5734 | 3.9396 | | |
| 13 | ∞ | 0.0000 | Second optical path bending means | |
| 14 | ∞ | 3.8026 | | |
| 15 | 118.7760 | 0.2492 | 1.80518 | 25.42 |
| 16 | 5.6890 | 2.5387 | 1.59282 | 68.62 |
| 17 | −6.8714 | 0.0382 | | |
| 18 | 10.3143 | 2.6702 | 1.65160 | 58.55 |
| 19 | −5.0732 | 1.5513 | 1.80518 | 25.42 |
| 20 | 11.7432 | 0.9153 | | |
| *21 | −85.1980 | 0.9506 | 1.51007 | 56.24 |
| *22 | −15.9578 | 2.6015 | | |
| 23 | 79.1298 | 2.3027 | 1.80518 | 25.42 |
| 24 | −9.1227 | 10.7955 | | |
| 25 | ∞ | 0.0000 | First optical path bending means | |
| 26 | ∞ | 2.8519 | | |
| 27 | −30.0089 | 0.4296 | 1.80518 | 25.42 |
| 28 | 8.9423 | 3.7247 | 1.60562 | 43.71 |
| 29 | −10.7747 | 0.0380 | | |
| 30 | 14.8618 | 1.7323 | 1.80400 | 46.58 |
| 31 | −43.2477 | 2.5494 | | |
| 32 | 6.8161 | 1.7763 | 1.80400 | 46.58 |
| 33 | −18.9168 | 0.2378 | 1.51742 | 52.43 |
| 34 | 3.5606 | 3.6937 | | |
| 35 (stop) | ∞ | 0.4566 | | |
| 36 | −3.1391 | 0.1921 | 1.80518 | 25.42 |
| 37 | 5.7762 | 1.0367 | 1.59282 | 68.62 |
| 38 | −4.3960 | 0.8015 | | |
| 39 | −185.9641 | 3.5097 | 1.48749 | 70.24 |
| 40 | −5.0890 | 0.0382 | | |
| 41 | 8.7749 | 1.2786 | 1.80518 | 25.42 |
| 42 | −82.3017 | 3.3434 | | |
| 43 | ∞ | 4.7532 | 1.51633 | 64.14 |
| 44 | ∞ | | | |

Second optical path bending means positioned at 3.9396 toward the reduction side from the 12th surface
First optical path bending means positioned at 10.7955 toward the reduction side from the 22nd surface

TABLE 8

Example 3: Items (d line)

| | |
|---|---|
| f | −1.00 |
| Bf | 6.49 |
| FNo. | 2.00 |
| 2ω [°] | 137.2 |

TABLE 9

Example 3: Aspherical Surface Coefficients

| | Surface Number | | |
|---|---|---|---|
| | 1 | 2 | 21 |
| KA | −9.7838303E−01 | −2.6347599E−02 | 1.0000000E+00 |
| A3 | 1.7745692E−02 | 2.2903118E−02 | 0.0000000E+00 |
| A4 | 3.1804157E−03 | −3.0350282E−03 | 1.1028892E−02 |
| A5 | −1.8105557E−03 | 3.3186241E−05 | −3.4560622E−03 |
| A6 | 2.1912345E−04 | 1.0526652E−04 | 6.7953883E−04 |
| A7 | 2.2206788E−05 | −1.9795493E−05 | 3.3574732E−04 |
| A8 | −7.4954415E−06 | −1.0039607E−06 | −3.6915532E−04 |
| A9 | 1.6658017E−07 | 4.9003027E−07 | 3.3471927E−05 |
| A10 | 1.1584383E−07 | −6.9036888E−09 | 4.0859303E−05 |
| A11 | −9.7504792E−09 | −5.3997242E−09 | −8.1250707E−06 |

TABLE 9-continued

Example 3: Aspherical Surface Coefficients

| | | | |
|---|---|---|---|
| A12 | −6.5436739E−10 | 1.9679141E−10 | −2.0676654E−06 |
| A13 | 1.0811525E−10 | 2.8987621E−11 | 5.7889510E−07 |
| A14 | −8.7836424E−13 | −1.3215137E−12 | 5.0174747E−08 |
| A15 | −3.8863108E−13 | −6.2055308E−14 | −1.8562606E−08 |
| A16 | 1.4852258E−14 | 2.9502248E−15 | −4.6261415E−10 |
| A17 | — | — | 2.3023163E−10 |

| | Surface Number 22 |
|---|---|
| KA | 1.0000000E+00 |
| A3 | 0.0000000E+00 |
| A4 | 1.1686461E−02 |
| A5 | 1.1628046E−03 |
| A6 | −2.3602068E−03 |
| A7 | 9.5211393E−04 |
| A8 | 6.5610185E−05 |
| A9 | −2.3291961E−04 |
| A10 | 4.7859293E−05 |
| A11 | 1.7803555E−05 |
| A12 | −6.5699490E−06 |
| A13 | −3.1176802E−07 |
| A14 | 3.2974300E−07 |
| A15 | −1.8680233E−08 |
| A16 | −5.8711149E−09 |
| A17 | 6.3669476E−10 |

Figure 4:
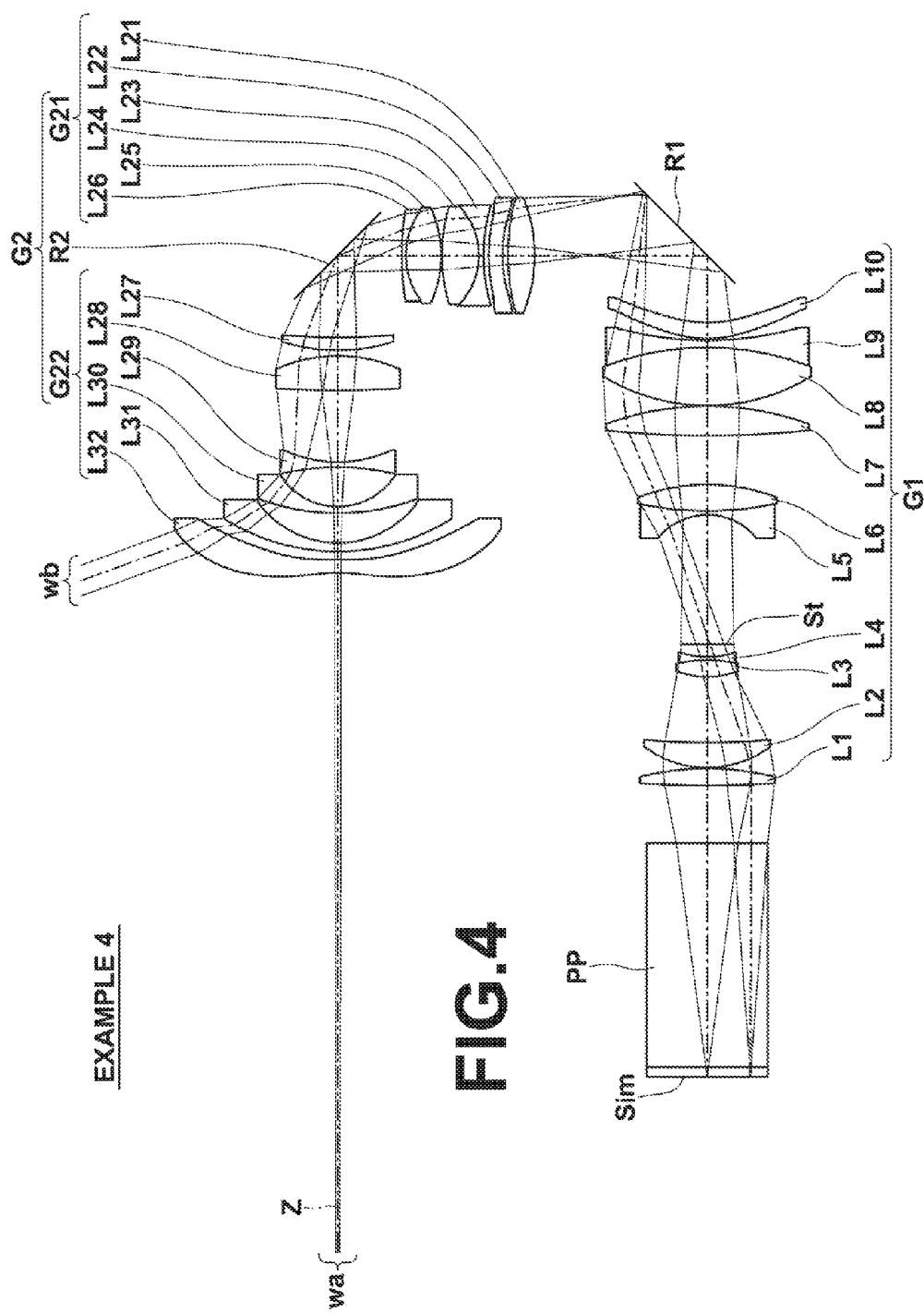
FIG. 4 is a sectional diagram that illustrates the configuration of a projection optical system according to Example 4 of the present disclosure.
Figure 11:
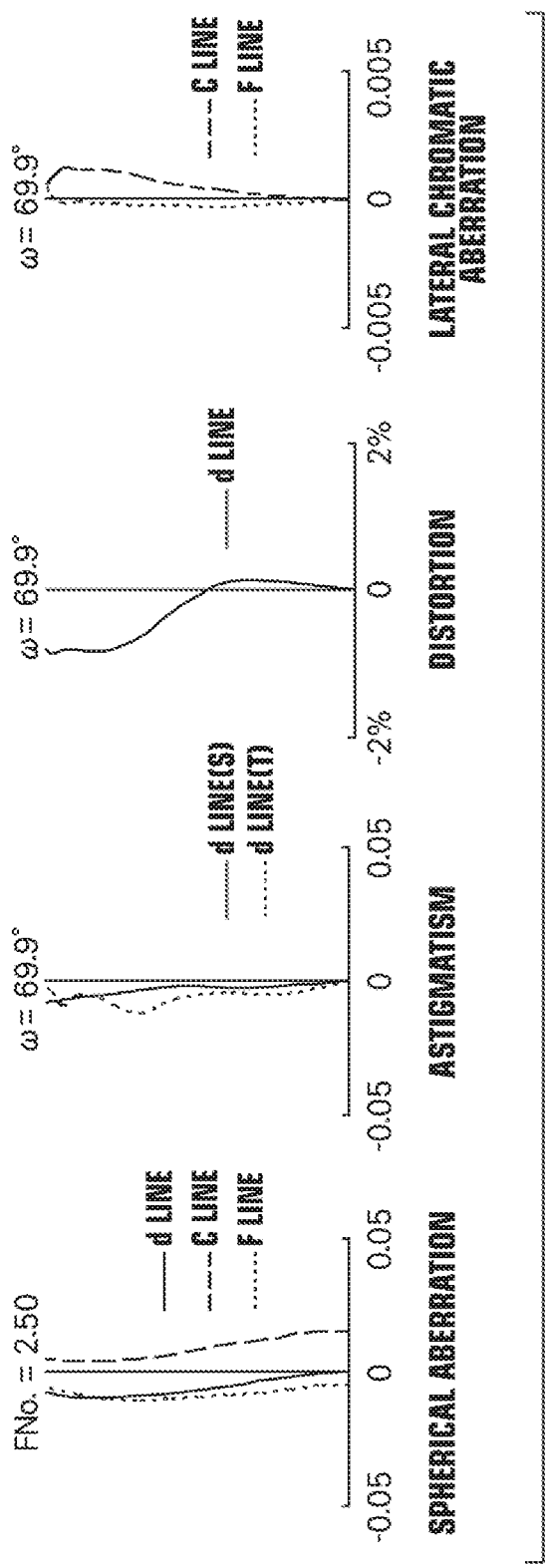
FIG. 11 is a collection of diagrams that illustrate aberrations of the projection optical system of Example 4.

Next, a projection optical system according to Example 4 will be described. FIG. 4 is a sectional diagram that illustrates the configuration of the projection optical system according to Example 4. The configuration of the projection optical system according to Example 4 is the same as that according to Example 1. In addition, basic lens data are shown in Table 10, data related to various items are shown in Table 11, data related to aspherical surface coefficients are shown in Table 12, and diagrams that illustrate aberrations are illustrated in FIG. 11 for the projection optical system according to Example 4. For Example 4, data are shown for a case in which the projection distance is 121.811.

TABLE 10

Example 4: Lens Data

| Surface Number | Radius of Curvature | Distance | nd | vd |
|---|---|---|---|---|
| *1 | −6.9306 | 0.8121 | 1.49100 | 57.58 |
| *2 | −44.8371 | 0.5265 | | |
| 3 | 13.5687 | 0.5483 | 1.80518 | 25.42 |
| 4 | 6.2556 | 1.8879 | | |
| 5 | 14.4551 | 0.4058 | 1.79952 | 42.22 |
| 6 | 4.3283 | 2.5036 | | |
| 7 | −15.5363 | 0.3246 | 1.80400 | 46.58 |
| 8 | 8.0372 | 4.5605 | | |
| 9 | 71.2289 | 2.1682 | 1.64769 | 33.79 |
| 10 | −9.5623 | 0.3540 | | |
| 11 | 11.7365 | 0.8240 | 1.80518 | 25.42 |
| 12 | 46.7315 | 9.2507 | | |
| 13 | ∞ | 0.0000 | Second optical path bending means | |
| 14 | ∞ | 4.0604 | | |
| 15 | 17.9887 | 0.2657 | 1.80518 | 25.42 |
| 16 | 4.8108 | 2.2397 | 1.53775 | 74.70 |
| 17 | −7.2175 | 0.0404 | | |
| 18 | 10.5125 | 2.3557 | 1.67790 | 55.34 |
| 19 | −4.4440 | 0.2942 | 1.80518 | 25.42 |
| 20 | 11.1288 | 0.3251 | | |
| *21 | 12.2198 | 0.8907 | 1.51007 | 56.24 |
| *22 | 13.5064 | 0.3292 | | |
| 23 | 13.7443 | 1.6941 | 1.59282 | 68.62 |
| 24 | −9.8049 | 15.2264 | | |

TABLE 10-continued

Example 4: Lens Data

| Surface Number | Radius of Curvature | Distance | nd | vd |
|---|---|---|---|---|
| 25 | ∞ | 0.0000 | First optical path bending means | |
| 26 | ∞ | 4.2634 | | |
| *27 | −7.0308 | 1.0153 | 1.51007 | 56.24 |
| *28 | −6.8249 | 0.1013 | | |
| 29 | −21.7935 | 0.4587 | 1.80518 | 25.42 |
| 30 | 18.3685 | 3.6762 | 1.80400 | 46.58 |
| 31 | −12.7408 | 0.0404 | | |
| 32 | 18.9842 | 1.8629 | 1.80400 | 46.58 |
| 33 | −63.2950 | 3.1011 | | |
| 34 | 12.2347 | 1.6669 | 1.80400 | 46.58 |
| 35 | −21.4475 | 0.2536 | 1.54814 | 45.78 |
| 36 | 4.0727 | 8.1896 | | |
| 37 (stop) | ∞ | 0.8035 | | |
| 38 | −5.8768 | 0.2051 | 1.84666 | 23.78 |
| 39 | 7.9679 | 1.0619 | 1.49700 | 81.54 |
| 40 | −5.4317 | 4.1679 | | |
| 41 | −45.9194 | 1.5980 | 1.51633 | 64.14 |
| 42 | −6.6372 | 0.0404 | | |
| 43 | 17.0560 | 1.0803 | 1.80518 | 25.42 |
| 44 | −66.7966 | 3.6543 | | |
| 45 | ∞ | 14.1859 | 1.51633 | 64.14 |
| 46 | ∞ | 0.6091 | 1.50847 | 61.19 |
| 47 | ∞ | | | |

Second optical path bending means positioned at 5.1903 toward the reduction side from the 12th surface
First optical path bending means positioned at 10.9631 toward the reduction side from the 22nd surface

TABLE 11

Example 4: Items (d line)

| | |
|---|---|
| f | −1.00 |
| Bf | 13.45 |
| FNo. | 2.50 |
| 2ω [°] | 139.8 |

TABLE 12

Example 4: Aspherical Surface Coefficients

| | Surface Number | | |
|---|---|---|---|
| | 1 | 2 | 21 |
| KA | −9.6578232E−01 | 7.1797830E+00 | 1.0000000E+00 |
| A3 | 1.5152595E−02 | 1.7786856E−02 | 0.0000000E+00 |
| A4 | 2.4745249E−03 | −1.8010192E−03 | 7.2368068E−03 |
| A5 | −1.4192070E−03 | −2.1112616E−04 | −1.0862983E−03 |
| A6 | 1.7031530E−04 | 5.0422771E−05 | −8.5312809E−04 |
| A7 | 1.4163708E−05 | −8.7904656E−07 | −3.0853539E−04 |
| A8 | −4.9232854E−06 | −4.3347102E−07 | 7.6609049E−05 |
| A9 | 1.2572919E−07 | 4.1185022E−08 | 8.7265414E−05 |
| A10 | 6.7186825E−08 | −7.9498160E−10 | −1.3671151E−05 |
| A11 | −5.7701281E−09 | −3.3328951E−10 | −9.0721375E−06 |
| A12 | −3.2588431E−10 | 3.4304624E−11 | 1.5586581E−06 |
| A13 | 5.7373154E−11 | 1.0307507E−12 | 4.7059813E−07 |
| A14 | −6.4187374E−13 | −1.9225952E−13 | −7.5089483E−08 |
| A15 | −1.8715151E−13 | −1.0720720E−15 | −1.2172965E−08 |
| A16 | 7.2850548E−15 | 3.3466154E−16 | 1.2819746E−09 |
| A17 | — | — | 1.2480983E−10 |

| | Surface Number | | |
|---|---|---|---|
| | 22 | 27 | 28 |
| KA | 1.0000000E+00 | 1.0000000E+00 | 1.0000000E+00 |
| A3 | 0.0000000E+00 | 0.0000000E+00 | 0.0000000E+00 |
| A4 | 1.0409797E−02 | 2.0896951E−03 | 1.3888769E−03 |

TABLE 12-continued

Example 4: Aspherical Surface Coefficients

| A5 | 1.3491359E−03 | −1.6041807E−05 | 2.1379246E−04 |
| A6 | −2.5137397E−03 | −5.7456735E−05 | −1.7408475E−04 |
| A7 | −3.2541827E−04 | 2.5117861E−05 | 5.2556125E−05 |
| A8 | 3.4362373E−04 | −8.5697549E−06 | −2.8508038E−07 |
| A9 | 1.9870848E−05 | 6.4738130E−08 | −4.4651233E−06 |
| A10 | −2.8029664E−05 | 7.3456995E−07 | 9.2310511E−07 |
| A11 | 2.5095644E−07 | −1.1220112E−07 | 9.9022538E−08 |
| A12 | 1.3425464E−06 | −2.2982349E−08 | −5.2005980E−08 |
| A13 | −7.8570318E−08 | 5.4013252E−09 | 1.7527741E−09 |
| A14 | −3.3597707E−08 | 3.0684516E−10 | 1.1516468E−09 |
| A15 | 3.2268052E−09 | −1.0235851E−10 | −9.8561406E−11 |
| A16 | 3.3008718E−10 | −1.2594636E−12 | −9.2007459E−12 |
| A17 | −4.3653244E−11 | 7.0689178E−13 | 1.0505968E−12 |

Figure 5:
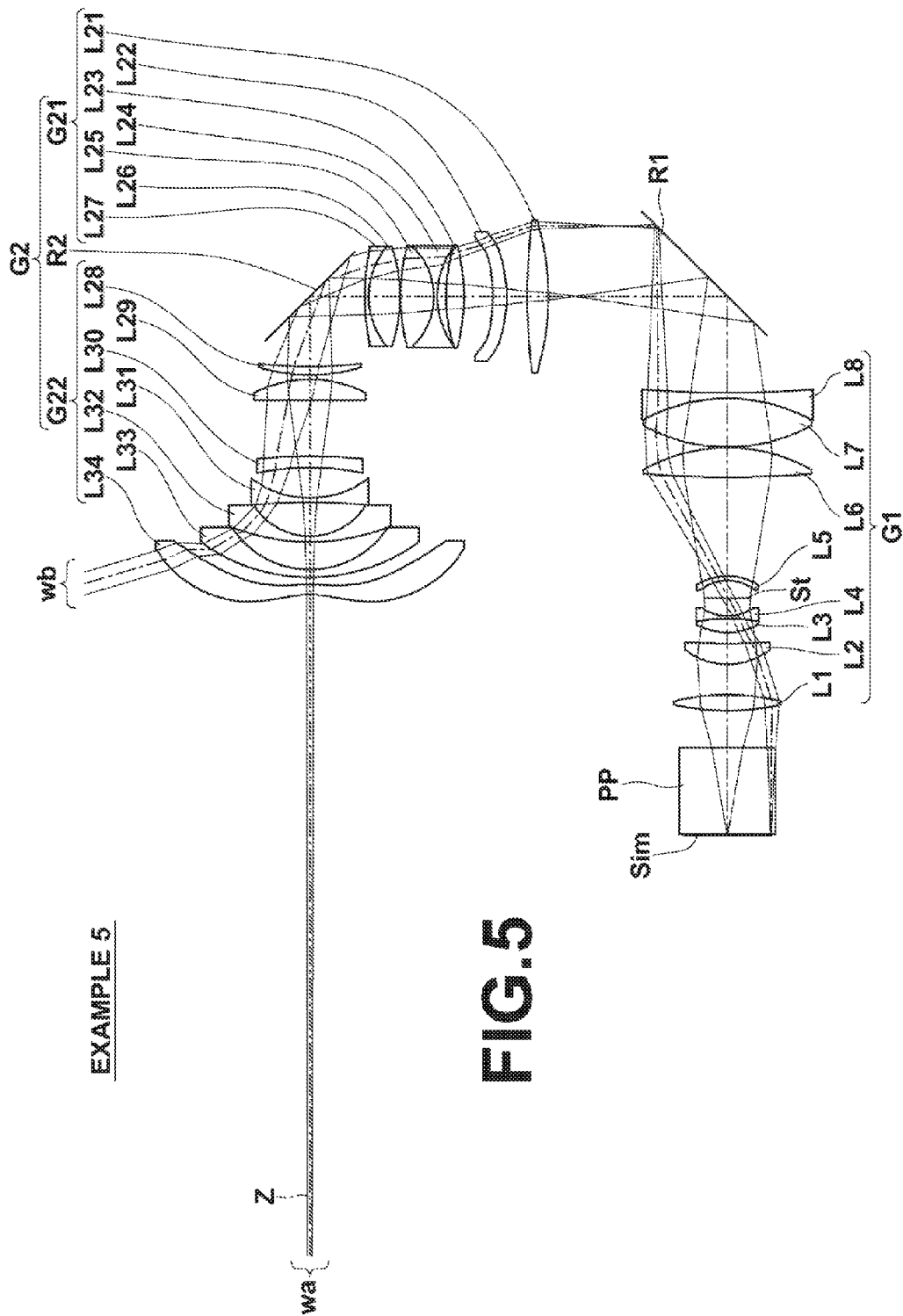
FIG. 5 is a sectional diagram that illustrates the configuration of a projection optical system according to Example 5 of the present disclosure.
Figure 12:
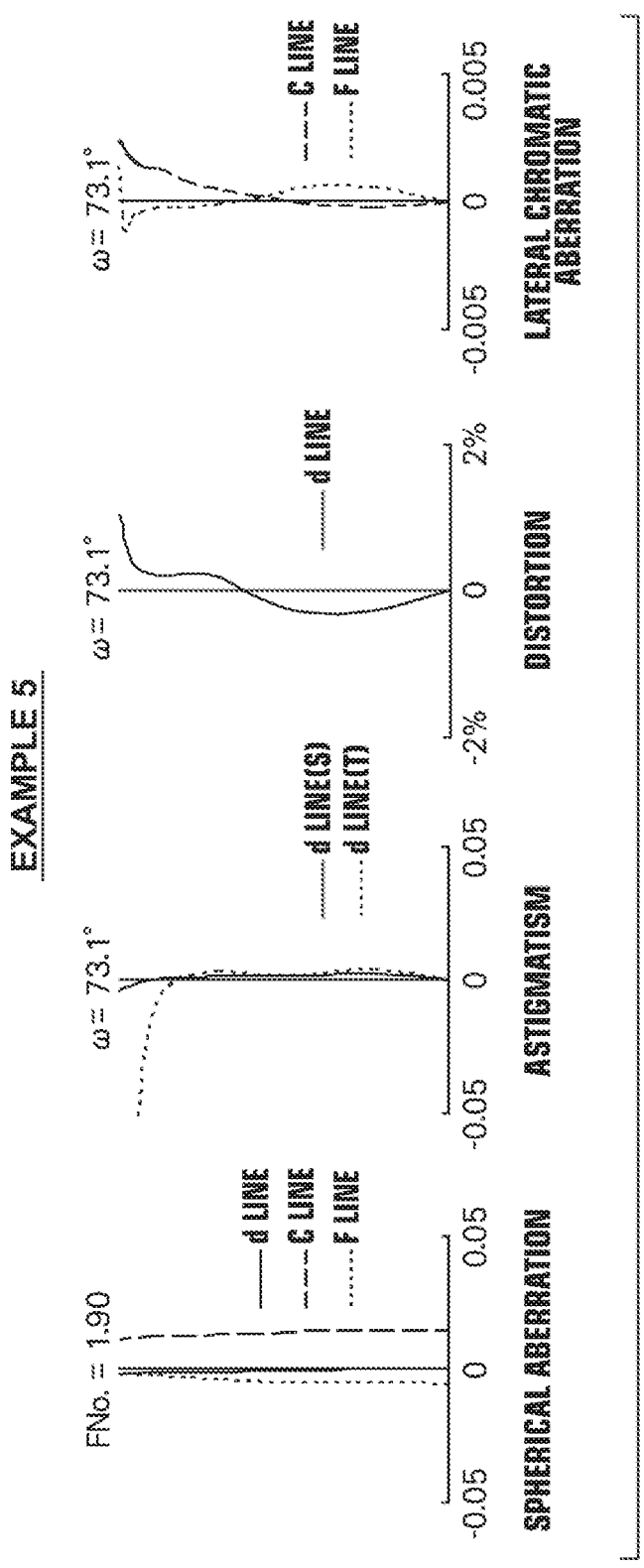
FIG. 12 is a collection of diagrams that illustrate aberrations of the projection optical system of Example 5.

Next, a projection optical system according to Example 5 will be described. FIG. 5 is a sectional diagram that illustrates the configuration of the projection optical system according to Example 5. In the projection optical system according to Example 5, a first optical system G1 is constituted by eight lenses, which are lenses L1 through L8, a first lens group G21 within a second optical system G2 is constituted by seven lenses, which are lenses L21 through L27, and a second lens group G22 is constituted by seven lenses, which are lenses L28 through L34. In addition, basic lens data are shown in Table 13, data related to various items are shown in Table 14, data related to aspherical surface coefficients are shown in Table 15, and diagrams that illustrate aberrations are illustrated in FIG. 12 for the projection optical system according to Example 5. For Example 5, data are shown for a case in which the projection distance is 193.485.

TABLE 13

Example 5: Lens Data

| Surface Number | Radius of Curvature | Distance | nd | vd |
|---|---|---|---|---|
| *1 | −5.6596 | 0.7533 | 1.53158 | 55.08 |
| *2 | −16.3802 | 0.5746 | | |
| 3 | 14.3992 | 0.5991 | 1.83481 | 42.72 |
| 4 | 7.2250 | 2.1723 | | |
| 5 | 16.5662 | 0.4452 | 1.83400 | 37.16 |
| 6 | 5.0703 | 2.6525 | | |
| 7 | −46.4337 | 0.3425 | 1.67790 | 55.34 |
| 8 | 7.4771 | 2.3614 | | |
| *9 | −38.9505 | 0.9035 | 1.49100 | 57.58 |
| *10 | −81.9445 | 4.3890 | | |
| 11 | 2242.0095 | 1.6268 | 1.56732 | 42.82 |
| 12 | −9.5556 | 0.3537 | | |
| 13 | 13.7977 | 0.6579 | 1.84666 | 23.78 |
| 14 | 36.1136 | 5.4792 | | |
| 15 | ∞ | 0.0000 | Second optical path bending means | |
| 16 | ∞ | 4.2806 | | |
| 17 | 19.1527 | 0.2928 | 1.80518 | 25.46 |
| 18 | 6.0893 | 2.4380 | 1.59282 | 68.62 |
| 19 | −11.9454 | 0.0427 | | |
| 20 | 16.0233 | 2.5802 | 1.69680 | 55.53 |
| 21 | −5.4733 | 0.2740 | 1.72825 | 28.46 |
| 22 | 6.6027 | 0.6754 | | |
| 23 | 13.0660 | 1.3889 | 1.49700 | 81.61 |
| 24 | −15.6033 | 2.2536 | | |
| *25 | −10.4647 | 1.0976 | 1.49100 | 57.58 |
| *26 | −6.7619 | 1.5735 | | |
| 27 | 46.2663 | 1.6396 | 1.84666 | 23.78 |
| 28 | −21.0908 | 13.9124 | | |
| 29 | ∞ | 0.000 | First optical path bending means | |

TABLE 13-continued

Example 5: Lens Data

| Surface Number | Radius of Curvature | Distance | nd | vd |
|---|---|---|---|---|
| 30 | ∞ | 7.5339 | | |
| 31 | −85.4771 | 0.4486 | 1.80518 | 25.46 |
| 32 | 13.5453 | 3.8081 | 1.54814 | 45.78 |
| 33 | −13.3932 | 0.0341 | | |
| 34 | 13.1189 | 2.3187 | 1.80400 | 46.58 |
| 35 | −86.5640 | 7.7542 | | |
| 36 | 4.6327 | 0.3402 | 1.53172 | 48.84 |
| 37 | 3.4248 | 1.3953 | | |
| 38 (stop) | ∞ | 1.3698 | | |
| 39 | −3.5518 | 0.2073 | 1.80518 | 25.46 |
| 40 | 12.7160 | 1.0861 | 1.59282 | 68.62 |
| 41 | −5.1660 | 0.8689 | | |
| 42 | −60.7625 | 1.6228 | 1.49700 | 81.61 |
| 43 | −5.3392 | 2.3935 | | |
| 44 | 17.4292 | 1.2453 | 1.80809 | 22.76 |
| 45 | −18.4369 | 2.9837 | | |
| 46 | ∞ | 6.7814 | 1.51633 | 64.14 |
| 47 | ∞ | | | |

Second optical path bending means positioned at 5.4792 toward the reduction side from the 14th surface
First optical path bending means positioned at 13.9124 toward the reduction side from the 26th surface

TABLE 14

Example 5: Items (d line)

| f | −1.00 |
| Bf | 7.46 |
| FNo. | 1.90 |
| 2ω [°] | 146.2 |

TABLE 15

Example 5: Aspherical Surface Coefficients

| | Surface Number | | |
|---|---|---|---|
| | 1 | 2 | 9 |
| KA | −1.1816188E+00 | −1.3324618E+01 | 1.0000000E+00 |
| A3 | 9.9914448E−03 | 1.8025934E−02 | 0.0000000E+00 |
| A4 | 1.9941605E−03 | −1.6590684E−02 | −3.5796035E−03 |
| A5 | −6.2703958E−04 | 1.6231240E−02 | 1.0861780E−03 |
| A6 | 4.0424283E−05 | −1.0738823E−02 | 1.9213727E−04 |
| A7 | 5.2426763E−06 | 4.9447881E−03 | −1.6203496E−04 |
| A8 | −9.0449589E−07 | −1.6200774E−03 | 8.1745411E−06 |
| A9 | 4.0097482E−09 | 3.8466696E−04 | 9.9925225E−06 |
| A10 | 8.5415190E−09 | −6.6958175E−05 | −1.3729672E−06 |
| A11 | −5.4877705E−10 | 8.5531167E−06 | −2.0453540E−07 |
| A12 | −2.5750016E−11 | −7.9253815E−07 | 4.1005319E−08 |
| A13 | 3.9725886E−12 | 5.1808517E−08 | −7.5519988E−10 |
| A14 | −5.7578837E−14 | −2.2637072E−09 | −3.0968595E−11 |
| A15 | −8.8476101E−15 | 5.9290878E−11 | 0.0000000E+00 |
| A16 | 3.3317364E−16 | −7.0358287E−13 | 0.0000000E+00 |
| A17 | — | — | 0.0000000E+00 |

| | Surface Number | | |
|---|---|---|---|
| | 10 | 25 | 26 |
| KA | 1.0000000E+00 | 1.0000000E+00 | 1.0000000E+00 |
| A3 | 0.0000000E+00 | 0.0000000E+00 | 0.0000000E+00 |
| A4 | −2.0633751E−03 | 6.5744572E−03 | 9.5826426E−03 |
| A5 | 5.0576859E−04 | −1.5664386E−03 | −1.7691499E−03 |
| A6 | 2.2728842E−04 | −8.1425427E−04 | −5.2488705E−04 |
| A7 | −1.2340116E−04 | 2.8588920E−04 | 1.3275678E−04 |
| A8 | 6.1449182E−07 | 4.3874670E−05 | 1.7872875E−05 |
| A9 | 9.7487777E−06 | −3.0501761E−05 | −4.4079773E−06 |
| A10 | −1.5115907E−06 | −4.7115824E−07 | −6.1994851E−07 |
| A11 | −1.5091304E−07 | 2.0101846E−06 | 3.4847902E−08 |

TABLE 15-continued

| | Example 5: Aspherical Surface Coefficients | | |
|---|---|---|---|
| A12 | 5.8002139E−08 | −1.0264767E−07 | 1.7662157E−08 |
| A13 | −6.8430174E−09 | −8.0165715E−08 | 1.9499489E−09 |
| A14 | 4.4980543E−10 | 5.6191783E−09 | −2.2111521E−10 |
| A15 | 0.0000000E+00 | 1.7533315E−09 | −5.4715476E−11 |
| A16 | 0.0000000E+00 | −8.4020597E−11 | 5.5653886E−13 |
| A17 | 0.0000000E+00 | −1.5951602E−11 | 4.2354510E−13 |

Figure 6:
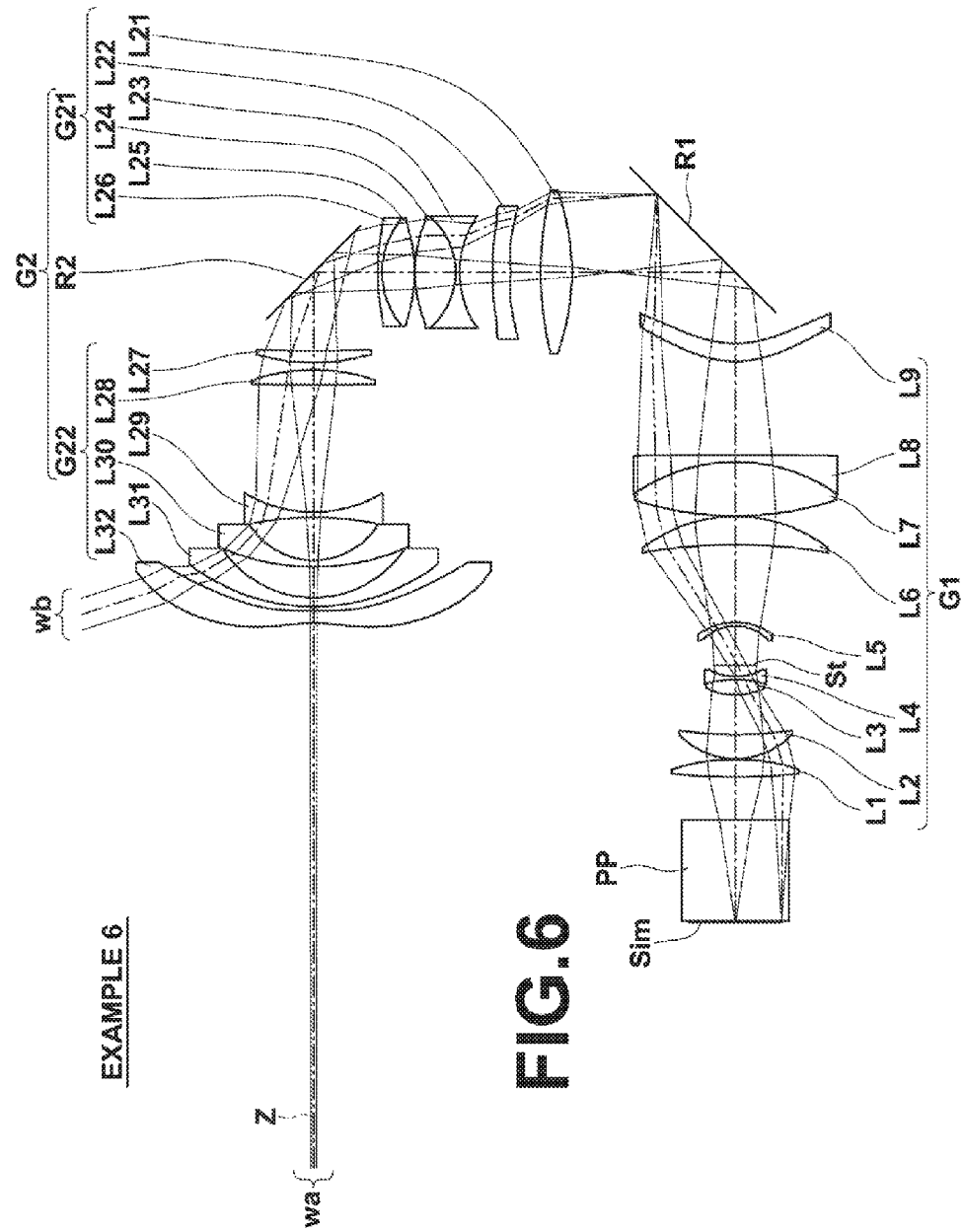
FIG. 6 is a sectional diagram that illustrates the configuration of a projection optical system according to Example 6 of the present disclosure.
Figure 13:
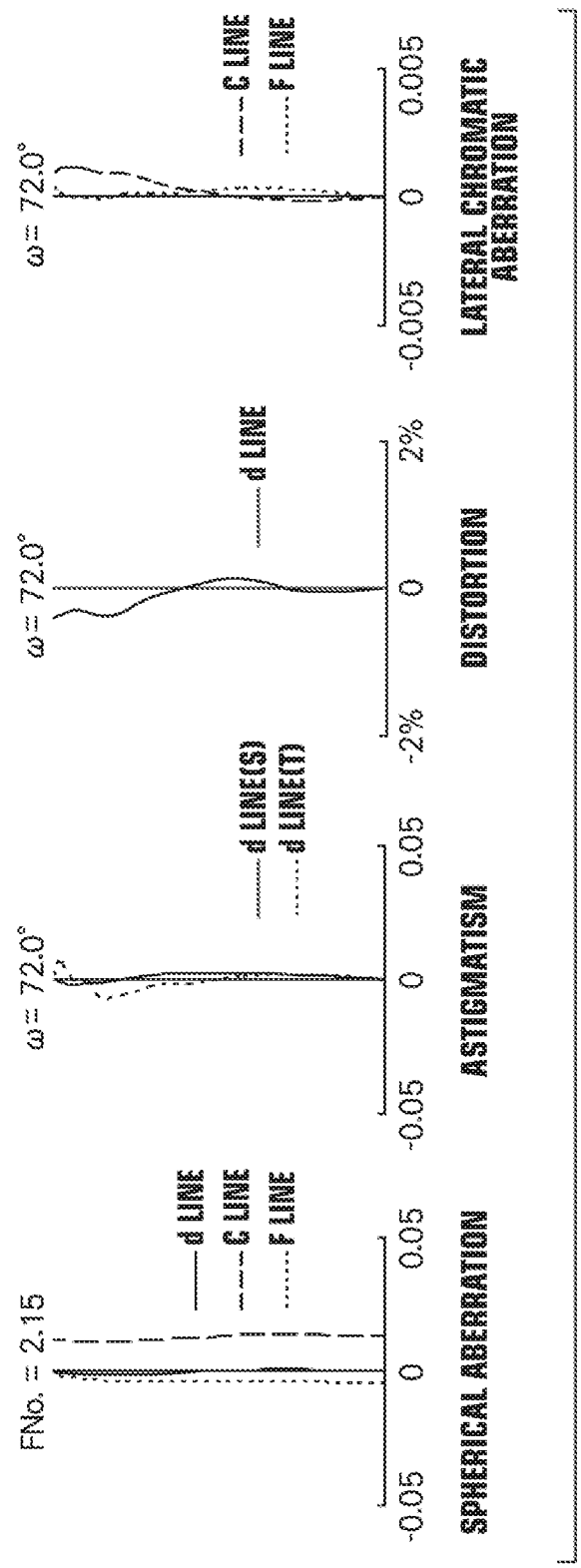
FIG. 13 is a collection of diagrams that illustrate aberrations of the projection optical system of Example 6.

Next, a projection optical system according to Example 6 will be described. FIG. 6 is a sectional diagram that illustrates the configuration of the projection optical system according to Example 6. The projection optical system according to Example 6 is the same as that according to Example 1, except that a first optical system G1 is constituted by nine lenses, which are lenses L1 through L9. In addition, basic lens data are shown in Table 16, data related to various items are shown in Table 17, data related to aspherical surface coefficients are shown in Table 18, and diagrams that illustrate aberrations are illustrated in FIG. 13 for the projection optical system according to Example 6. For Example 6, data are shown for a case in which the projection distance is 193.308.

TABLE 16

Example 6: Lens Data

| Surface Number | Radius of Curvature | Distance | nd | vd |
|---|---|---|---|---|
| *1 | −7.8431 | 0.8210 | 1.53158 | 55.08 |
| *2 | −40.3388 | 0.2762 | | |
| 3 | 13.5021 | 0.5986 | 1.83400 | 37.16 |
| 4 | 7.2749 | 2.0717 | | |
| 5 | 15.5196 | 0.4446 | 1.80400 | 46.58 |
| 6 | 5.0340 | 2.8719 | | |
| 7 | −20.9879 | 0.3591 | 1.77250 | 49.60 |
| 8 | 8.9222 | 8.5533 | | |
| 9 | 564.7144 | 0.9891 | 1.54814 | 45.78 |
| 10 | −12.7779 | 0.4910 | | |
| 11 | 13.4910 | 0.7918 | 1.84666 | 23.78 |
| 12 | 88.8120 | 5.2780 | | |
| 13 | ∞ | 0.0000 | Second optical path bending means | |
| 14 | ∞ | 4.2767 | | |
| 15 | 16.1687 | 0.2924 | 1.80518 | 25.42 |
| 16 | 5.6967 | 2.1478 | 1.49700 | 81.54 |
| 17 | −10.8982 | 0.0426 | | |
| 18 | 9.2883 | 2.6961 | 1.77250 | 49.60 |
| 19 | −4.9601 | 0.2738 | 1.80518 | 25.42 |
| 20 | 6.5971 | 2.1956 | | |
| *21 | 117.6592 | 1.1976 | 1.49100 | 57.58 |
| *22 | −20.1220 | 2.0104 | | |
| 23 | 23.1638 | 2.0712 | 1.80518 | 25.42 |
| 24 | −16.0224 | 10.8979 | | |
| 25 | ∞ | 0.0000 | First optical path bending means | |
| 26 | ∞ | 4.7899 | | |
| *27 | −6.8792 | 1.1976 | 1.49100 | 57.58 |
| *28 | −7.0459 | 6.2838 | | |
| 29 | 439.3811 | 0.4653 | 1.80518 | 25.42 |
| 30 | 11.6780 | 3.6301 | 1.77250 | 49.60 |
| 31 | −21.3793 | 0.0344 | | |
| 32 | 10.1113 | 1.8923 | 1.83481 | 42.72 |
| 33 | 36.7596 | 5.2069 | | |
| 34 | 4.1405 | 0.2396 | 1.54814 | 45.78 |
| 35 | 2.9701 | 2.6461 | | |
| 36 (stop) | ∞ | 0.7601 | | |
| 37 | −3.6394 | 0.2070 | 1.80518 | 25.42 |
| 38 | 7.2962 | 1.0283 | 1.59282 | 68.62 |
| 39 | −4.3434 | 2.6611 | | |
| 40 | −25.8763 | 1.6263 | 1.48749 | 70.24 |

TABLE 16-continued

Example 6: Lens Data

| Surface Number | Radius of Curvature | Distance | nd | vd |
|---|---|---|---|---|
| 41 | −5.1461 | 0.0343 | | |
| 42 | 13.4402 | 1.1842 | 1.80809 | 22.76 |
| 43 | −38.5360 | 2.9797 | | |
| 44 | ∞ | 6.7752 | 1.51633 | 64.14 |
| 45 | ∞ | | | |

Second optical path bending means positioned at 5.2780 toward the reduction side from the 12th surface
First optical path bending means positioned at 10.8979 toward the reduction side from the 22nd surface

TABLE 17

| Example 6: Items (d line) | |
|---|---|
| f | −1.00 |
| Bf | 7.44 |
| FNo. | 2.15 |
| 2ω (°) | 144.0 |

TABLE 18

Example 6: Aspherical Surface Coefficients

| | Surface Number | | |
|---|---|---|---|
| | 1 | 2 | 21 |
| KA | −8.6374673E−01 | 2.8058941E+00 | 1.0000000E+00 |
| A3 | 1.0892111E−02 | 1.3536870E−02 | 0.0000000E+00 |
| A4 | 2.0602299E−03 | −1.7423092E−03 | 7.6281741E−03 |
| A5 | −8.4137148E−04 | 1.4102816E−04 | −1.6584501E−03 |
| A6 | 8.4099509E−05 | 3.0740117E−05 | −1.0742824E−04 |
| A7 | 6.2292141E−06 | −1.0742136E−05 | 1.2151217E−04 |
| A8 | −1.9915067E−06 | 2.1190422E−07 | −7.1304107E−05 |
| A9 | 5.8146838E−08 | 1.8001317E−07 | 4.9527146E−06 |
| A10 | 2.1536466E−08 | −9.8113054E−09 | 6.6513222E−06 |
| A11 | −1.8578714E−09 | −1.4131917E−09 | −1.1932142E−06 |
| A12 | −7.7044970E−11 | 9.7692964E−11 | −2.7738852E−07 |
| A13 | 1.4424950E−11 | 5.4836221E−12 | 6.8601540E−08 |
| A14 | −1.9347377E−13 | −4.1353110E−13 | 6.5114905E−09 |
| A15 | −3.7177479E−14 | −8.5800894E−15 | −1.7418222E−09 |
| A16 | 1.3629548E−15 | 6.4708517E−16 | −7.0262339E−11 |
| A17 | — | — | 1.6869216E−11 |

| | Surface Number | | |
|---|---|---|---|
| | 22 | 27 | 28 |
| KA | 1.0000000E+00 | 1.0000000E+00 | 1.0000000E+00 |
| A3 | 0.0000000E+00 | 0.0000000E+00 | 0.0000000E+00 |
| A4 | 9.6085359E−03 | 7.0444903E−04 | 5.7465459E−04 |
| A5 | −4.5097270E−04 | 2.1717416E−05 | −9.3658722E−05 |
| A6 | −5.7756899E−04 | −6.2182315E−05 | −1.5628839E−05 |
| A7 | 1.3491746E−04 | 5.9343722E−05 | 4.4605724E−05 |
| A8 | −1.7133910E−05 | −9.4771050E−06 | −9.4703870E−06 |
| A9 | −1.4555806E−05 | −3.5657278E−06 | −2.0686945E−06 |
| A10 | 4.4644466E−06 | 1.1643902E−06 | 8.7408667E−07 |
| A11 | 6.7813254E−07 | 4.5757831E−08 | 6.9936703E−09 |
| A12 | −2.6297019E−07 | −4.7738954E−08 | −3.1431820E−08 |
| A13 | −1.2159623E−08 | 2.1012941E−09 | 1.8298205E−09 |
| A14 | 6.9761449E−09 | 8.6855543E−10 | 5.1961946E−10 |
| A15 | −2.4056727E−11 | −7.1980760E−11 | −4.7665745E−11 |
| A16 | −7.0658022E−11 | −5.9292827E−12 | −3.2693494E−12 |
| A17 | 2.2005904E−12 | 6.3049866E−13 | 3.7035392E−13 |

Figure 7:
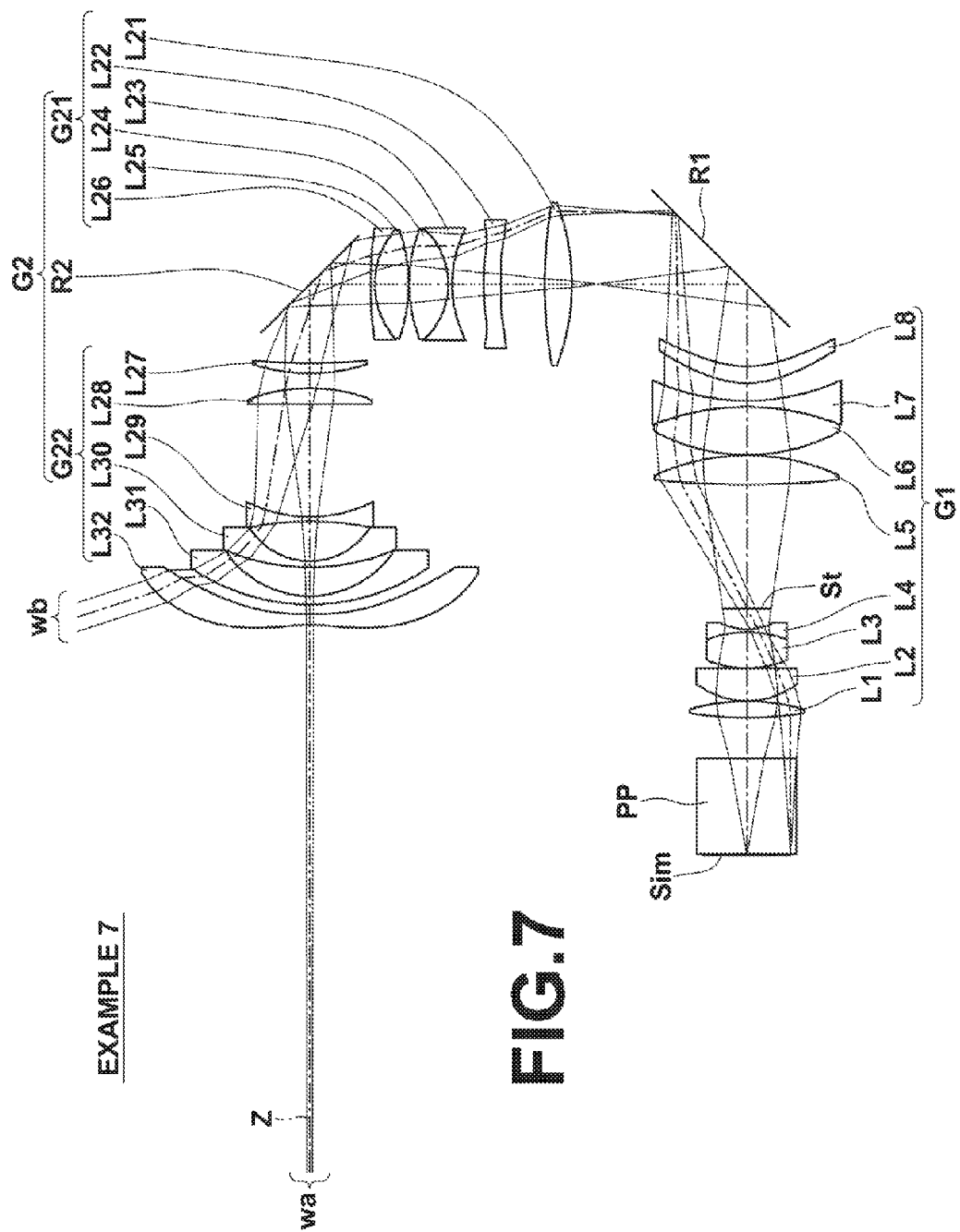
FIG. 7 is a sectional diagram that illustrates the configuration of a projection optical system according to Example 7 of the present disclosure.
Figure 14:
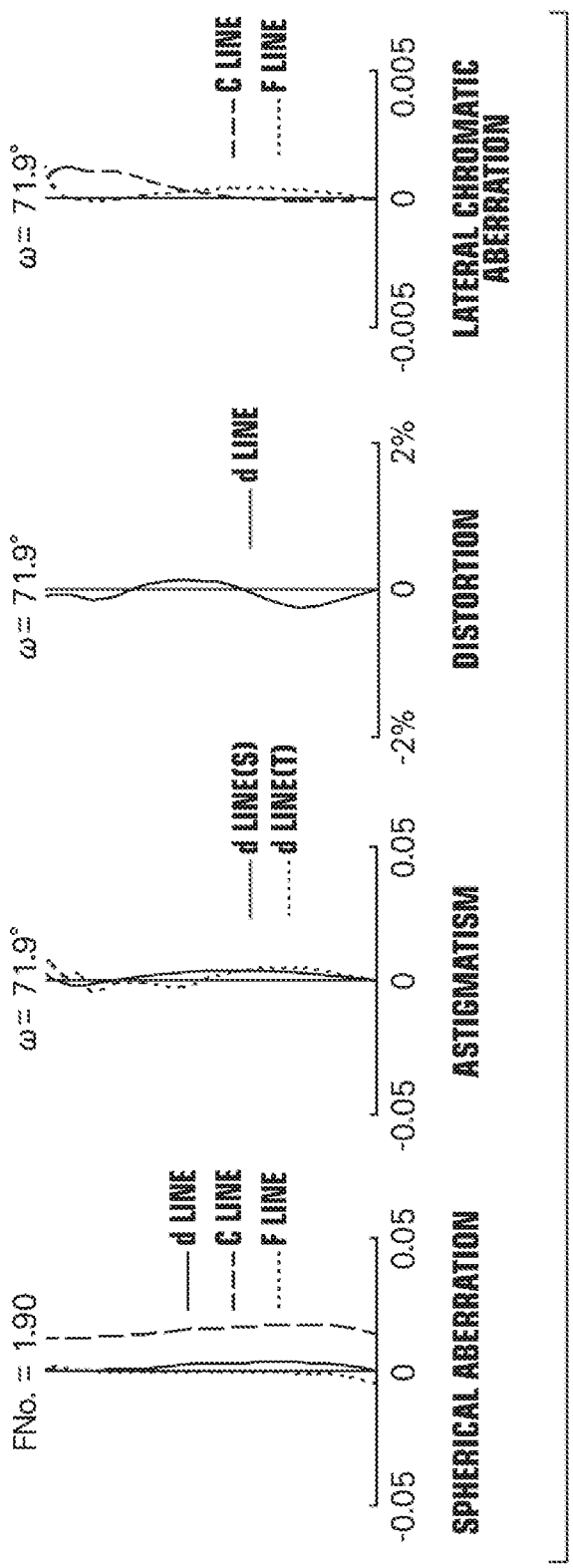
FIG. 14 is a collection of diagrams that illustrate aberrations of the projection optical system of Example 7.

Next, a projection optical system according to Example 7 will be described. FIG. 7 is a sectional diagram that illustrates the configuration of the projection optical system according to Example 7. The projection optical system according to Example 7 is the same as that according to Example 1, except that a first optical system G1 is constituted by eight lenses, which are lenses L1 through L8. In addition, basic lens data are shown in Table 19, data related to various items are shown in Table 20, data related to aspherical surface coefficients are shown in Table 21, and diagrams that illustrate aberrations are illustrated in FIG. 14 for the projection optical system according to Example 7. For Example 7, data are shown for a case in which the projection distance is 193.142.

TABLE 19

Example 7: Lens Data

| Surface Number | Radius of Curvature | Distance | nd | νd |
|---|---|---|---|---|
| *1 | −8.8721 | 0.7519 | 1.49100 | 57.58 |
| *2 | −254.6544 | 0.6815 | | |
| 3 | 14.7212 | 0.5981 | 1.80400 | 46.58 |
| 4 | 7.0737 | 2.0265 | | |
| 5 | 15.1030 | 0.4442 | 1.80400 | 46.58 |
| 6 | 4.9512 | 2.7912 | | |
| 7 | −22.6376 | 0.3420 | 1.80400 | 46.58 |
| 8 | 9.8694 | 7.9726 | | |
| 9 | 810.9992 | 1.1266 | 1.57501 | 41.50 |
| 10 | −11.9105 | 1.0465 | | |
| 11 | 12.8543 | 0.7293 | 1.84666 | 23.78 |
| 12 | 44.9139 | 5.5874 | | |
| 13 | ∞ | 0.0000 | Second optical path bending means | |
| 14 | ∞ | 4.2731 | | |
| 15 | 28.9195 | 0.2924 | 1.80518 | 25.46 |
| 16 | 5.9219 | 2.3732 | 1.59282 | 68.62 |
| 17 | −11.6693 | 0.0427 | | |
| 18 | 10.6865 | 2.7535 | 1.77250 | 49.60 |
| 19 | −5.3121 | 0.2734 | 1.80518 | 25.46 |
| 20 | 8.9458 | 2.2138 | | |
| *21 | 31.5562 | 1.1966 | 1.49100 | 57.58 |
| *22 | −35.3204 | 3.0720 | | |
| 23 | 32.6385 | 1.9133 | 1.84666 | 23.78 |
| 24 | −16.3598 | 12.2873 | | |
| 25 | ∞ | 0.0000 | First optical path bending means | |
| 26 | ∞ | 5.8114 | | |
| *27 | −7.1825 | 1.1966 | 1.49100 | 57.58 |
| *28 | −6.6518 | 1.2347 | | |
| 29 | −15.9865 | 0.4480 | 1.80518 | 25.46 |
| 30 | 17.6459 | 3.3889 | 1.77250 | 49.60 |
| 31 | −13.5422 | 0.0340 | | |
| 32 | 15.3862 | 2.0644 | 1.83481 | 42.72 |
| 33 | −63.0485 | 8.7700 | | |
| 34 (stop) | ∞ | 1.4720 | | |
| 35 | −3.9554 | 0.2067 | 1.80518 | 25.46 |
| 36 | 7.9139 | 2.5513 | 1.49700 | 81.61 |
| 37 | −7.1158 | 0.0340 | | |
| 38 | 2527.1384 | 2.2751 | 1.49700 | 81.61 |
| 39 | −5.8089 | 0.0340 | | |
| 40 | 14.7115 | 1.1539 | 1.80809 | 22.76 |
| 41 | −24.8086 | 2.9766 | | |
| 42 | ∞ | 6.7694 | 1.51633 | 64.14 |
| 43 | ∞ | | | |

Second optical path bending means positioned at 5.5874 toward the reduction side from the 12th surface
First optical path bending means positioned at 12.2873 toward the reduction side from the 22nd surface

TABLE 20

Example 7: Items (d line)

| | |
|---|---|
| f | −1.00 |
| Bf | 7.44 |
| FNo. | 1.90 |
| 2ω [°] | 143.8 |

TABLE 21

Example 7: Aspherical Surface Coefficients

| | Surface Number | | |
|---|---|---|---|
| | 1 | 2 | 21 |
| KA | −9.7629926E−01 | −1.0121161E+15 | 1.0000000E+00 |
| A3 | 1.0866457E−02 | 1.1735264E−02 | 0.0000000E+00 |
| A4 | 1.2868927E−03 | −1.4797870E−03 | 6.1198322E−03 |
| A5 | −6.7290615E−04 | −2.3225992E−06 | −1.4131764E−03 |
| A6 | 7.8702501E−05 | 2.8097790E−05 | −2.7703398E−04 |
| A7 | 3.3166760E−06 | −3.5929021E−06 | 5.0964556E−05 |
| A8 | −1.5818367E−06 | −9.1972990E−08 | 5.4732107E−06 |
| A9 | 7.2167764E−08 | 5.4110745E−08 | −5.9529727E−07 |
| A10 | 1.4205009E−08 | −1.9718799E−09 | −1.4406845E−06 |
| A11 | −1.4904643E−09 | −3.4590147E−10 | 2.1870466E−07 |
| A12 | −3.4313829E−11 | 2.1659611E−11 | 1.1543151E−07 |
| A13 | 9.7906392E−12 | 1.0456182E−12 | −2.1652483E−08 |
| A14 | −1.9373000E−13 | −8.2794522E−14 | −2.9163771E−09 |
| A15 | −2.2174334E−14 | −1.2553008E−15 | 7.4125754E−10 |
| A16 | 8.7986626E−16 | 1.0971963E−16 | 2.1213106E−11 |
| A17 | — | — | −8.6988400E−12 |

| | Surface Number | | |
|---|---|---|---|
| | 22 | 27 | 28 |
| KA | 1.0000000E+00 | 1.0000000E+00 | 1.0000000E+00 |
| A3 | 0.0000000E+00 | 0.0000000E+00 | 0.0000000E+00 |
| A4 | 9.7023658E−03 | 4.5207917E−04 | 5.4793408E−04 |
| A5 | −8.6522764E−04 | 4.8773125E−04 | 2.1179068E−04 |
| A6 | −6.3276099E−04 | −1.1315321E−04 | −3.2973787E−05 |
| A7 | 1.0747981E−04 | −1.4901296E−05 | 2.6130398E−06 |
| A8 | −1.1031205E−06 | 1.0410665E−05 | −2.2356759E−06 |
| A9 | −8.5955520E−06 | −7.9284129E−08 | 7.2361539E−07 |
| A10 | 2.4677641E−06 | −5.6734762E−07 | 1.3692429E−07 |
| A11 | 3.7054306E−07 | 3.4763323E−08 | −7.4515410E−08 |
| A12 | −1.4276631E−07 | 1.8251511E−08 | 1.2476395E−09 |
| A13 | −7.8425486E−09 | −1.6251086E−09 | 2.2957361E−09 |
| A14 | 3.5183434E−09 | −3.1272447E−10 | −1.5632446E−10 |
| A15 | 6.6949249E−11 | 3.2910950E−11 | −2.5652373E−11 |
| A16 | −3.2820464E−11 | 2.1959051E−12 | 2.1041002E−12 |
| A17 | −7.0996642E−14 | −2.4958836E−13 | 5.5467468E−14 |

Table 22 shows values corresponding to Conditional Formulae (1) through (10) for the projection optical systems according to Examples 1 through 7. Note that all of the Examples use the d line as a reference wavelength, and the values shown in Table 22 are related to the reference wavelength.

TABLE 22

| Formula | Condition | Example 1 | Example 2 | Example 3 | Example 4 |
|---|---|---|---|---|---|
| (1) | TL1/\|f\| | 22.81 | 19.68 | 21.50 | 29.32 |
| (2) | TL21/\|f\| | 12.05 | 12.03 | 13.82 | 8.43 |
| (3) | D12/\|f\| | 13.68 | 16.72 | 13.65 | 15.23 |
| (4) | D212/\|f\| | 8.72 | 8.78 | 7.74 | 9.25 |
| (5) | f2/\|f\| | 1.86 | 1.79 | 1.89 | 1.54 |
| (6) | Imφ · f2/f² | 9.56 | 9.20 | 9.70 | 8.44 |
| (7) | enP/TL2 | 0.117 | 0.117 | 0.120 | 0.132 |
| (8) | Imφ/TL2 | 0.143 | 0.143 | 0.138 | 0.168 |
| (9) | f22/f21 | 1.13 | 1.38 | 1.18 | 1.08 |
| (10) | Bf/\|f\| | 6.50 | 6.50 | 6.49 | 13.45 |

TABLE 22-continued

| Formula | Condition | Example 5 | Example 6 | Example 7 |
|---|---|---|---|---|
| (1) | TL1/\|f\| | 24.89 | 29.10 | 24.86 |
| (2) | TL21/\|f\| | 14.26 | 12.93 | 14.13 |
| (3) | D12/\|f\| | 21.45 | 15.69 | 18.10 |
| (4) | D212/\|f\| | 9.76 | 9.55 | 9.86 |
| (5) | f2/\|f\| | 1.80 | 1.91 | 1.92 |
| (6) | Imφ · f2/f² | 12.11 | 11.75 | 11.79 |
| (7) | enP/TL2 | 0.112 | 0.117 | 0.116 |
| (8) | Imφ/TL2 | 0.161 | 0.151 | 0.144 |
| (9) | f22/f21 | 0.61 | 0.61 | 0.73 |
| (10) | Bf/\|f\| | 7.46 | 7.44 | 7.44 |

Based on the above data, it can be understood that all of the projection optical systems according to Examples 1 through 7 satisfy Conditional Formulae (1) through (5), and are projection optical systems having high projection performance having wide angles of view of 135° or greater, that favorably correct various aberrations while achieving miniaturization.

Figure 15:
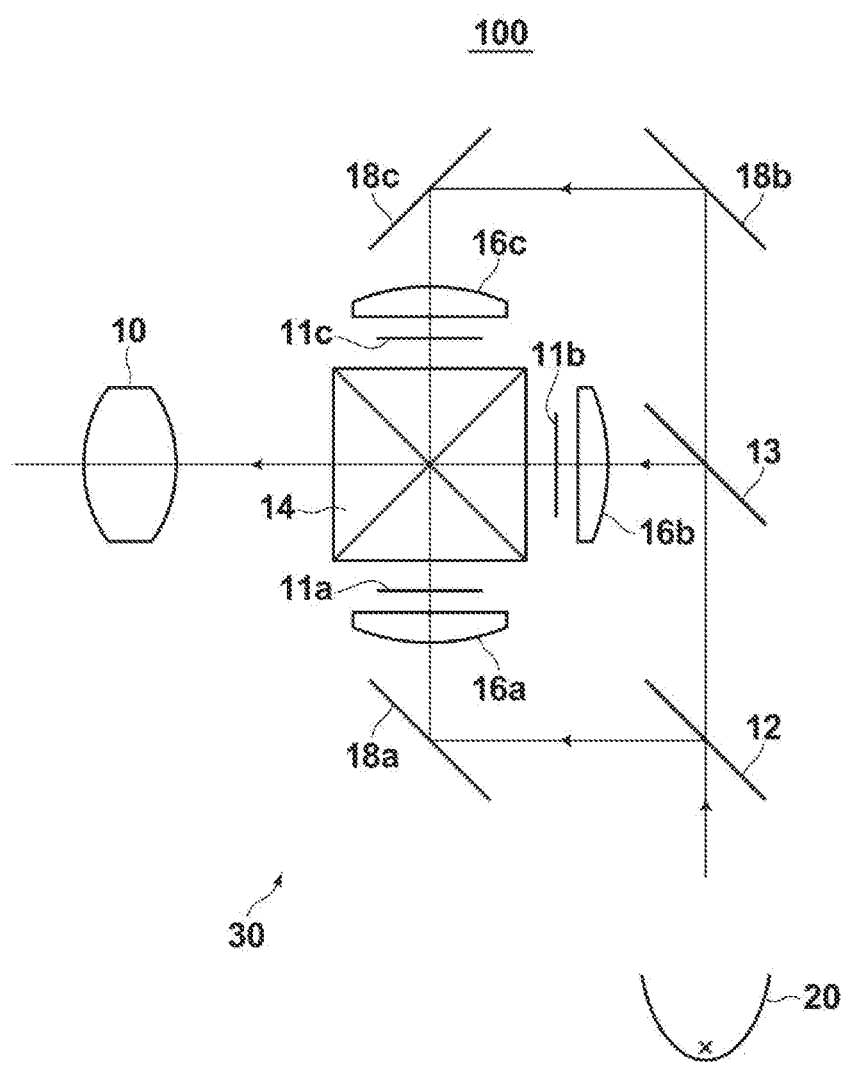
FIG. 15 is a diagram that schematically illustrates the configuration of a projection type display device according to an embodiment of the present disclosure.

Next, an embodiment of a projection type display device of the present disclosure will be described with reference to FIG. 15. FIG. 15 is a schematic diagram that illustrates a projection type display device according to the embodiment of the present disclosure.

The projection type display device 100 illustrated in FIG. 15 is equipped with: a projection optical system 10 according to an embodiment of the present disclosure; a light source 20; transmissive display elements 11a through 11c that function as light valves each corresponding to a colored light beam; and an illuminating optical section 30 that guides a light beam form the light source 20 to the light valves. The illuminating optical section has: dichroic mirrors 12 and 13 for separating colors; a cross dichroic prism 14 for combining colors; condenser lenses 16a through 16c; and total reflection mirrors 18a through 18c. Note that the projection optical system 10 is schematically illustrated in FIG. 15. In addition, although not illustrated in FIG. 15, an integrator such as a fly eye is provided between the light source 20 and the dichroic mirror 12.

White light output by the light source 20 is separated into three colored light beams (G light, B light, and R light) by the dichroic mirrors 12 and 13. The optical paths of the colored light beams are deflected by the total reflection mirrors 18a through 18c, then the colored light beams enter the transmissive display elements 11a through 11c corresponding thereto via the condenser lenses 16a through 16c and are optically modulated. After the colors are combined by the cross dichroic prism 14, the combined light beam enters the projection optical system 10. The projection optical system 10 projects an optical image formed by light which has been optically modulated by the transmissive display elements 11a through 11c onto a screen (not shown).

Transmissive liquid crystal display elements, for example, may be employed as the transmissive display elements 11a through 11c. Note that FIG. 15 illustrates an example in which transmissive display elements are employed as the light valves. However, the light valves to be provided in the projection type display device of the present disclosure are not limited to transmissive display elements, and other light modulating means such as reflective liquid crystal display elements and DMD's may alternatively be employed.

The projection type display device 100 of the present embodiment is equipped with the projection optical system 10 of the present disclosure. Therefore, the apparatus can be miniaturized, while high quality images can be projected at wide angles of view.

The present disclosure has been described with reference to the embodiments and Examples thereof. However, the present disclosure is not limited to the above embodiments and Examples, and various modifications are possible. For example, the values of the radii of curvature, the distances among surfaces, the refractive indices, the Abbe's numbers, and the aspherical surface coefficients of the lenses are not limited to those indicated in the above Examples, and may be other values.

What is claimed is:

1. A projection optical system that projects images displayed by image display elements provided on a reduction side conjugate plane onto a magnification side conjugate plane as a magnified image, consisting of, in order from the reduction side to the magnification side:
   a first optical system constituted by a plurality of lenses that forms the image displayed by the image display elements as an intermediate image;
   a first optical path bending means for bending an optical path with a reflective surface; and
   a second optical system constituted by a plurality of lenses that focuses the intermediate image on the magnification side conjugate plane;
   the second optical system consisting of, in order from the reduction side to the magnification side, a first lens group having a positive refractive power, a second optical path bending means for bending an optical path with a reflective surface, and a second lens group having a positive refractive power;
   Conditional Formulae (1) and (2) below being satisfied:

$$10.0 < TL1/|f| < 50.0 \quad (1)$$

$$4.0 < TL21/|f| < 30.0 \quad (2)$$

wherein TL1 is the distance along the optical axis from the surface most toward the reduction side to the surface most toward the magnification side within the first optical system, TL21 is the distance along the optical axis from the surface most toward the reduction side to the surface most toward the magnification side within the first lens group, and f is the focal length of the entire projection optical system; and
   Conditional Formula (5) below being satisfied:

$$1.50 < f2/|f| < 2.80 \quad (5)$$

wherein f2 is the focal length of the second optical system.

2. A projection optical system as defined in claim 1, in which Conditional Formula (1-1) and/or Conditional Formula (2-1) below are satisfied:

$$15.0 < TL1/|f| < 40.0 \quad (1-1)$$

$$15.0 < TL1/|f| < 40.0 \quad (1-1).$$

3. A projection optical system as defined in claim 1, in which Conditional Formulae (3) and (4) below are satisfied:

$$8.0 < D12/|f| < 30.0 \quad (3)$$

$$5.0 < D212/|f| < 20.0 \quad (4)$$

wherein D12 is the distance along the optical axis between the first optical system and the second optical system, D212 is the distance along the optical axis between the first lens group and the second lens group.

4. A projection optical system as defined in claim 3, in which Conditional Formula (3-1) and/or Conditional Formula (4-1) are satisfied:

$$10.0 < D12/|f| < 25.0 \quad (3\text{-}1)$$

$$6.0 < D212/|f| < 15.0 \quad (4\text{-}1).$$

5. A projection optical system as defined in claim 1, in which Conditional Formula (5-1) below is satisfied:

$$1.52 < f2/|f| < 2.20 \quad (5\text{-}1).$$

6. A projection optical system as defined in claim 1, in which Conditional Formula (7) below is satisfied:

$$0.020 < enP/TL2 < 0.160 \quad (7)$$

wherein enP is the distance along the optical axis from the surface most toward the magnification side in the second optical system to the position of an entrance pupil, if the magnification side is treated optically as though it were a light entry side, and TL2 is the distance along the optical axis from the surface most toward the reduction side in the second optical system to the surface most toward the magnification side in the second optical system.

7. A projection optical system as defined in claim 6, in which Conditional Formula (7-1) below is satisfied:

$$0.050 < enP/TL2 < 0.145 \quad (7\text{-}1).$$

8. A projection optical system as defined in claim 1, in which Conditional Formula (8) below is satisfied:

$$0.125 < Im\varphi/TL2 < 0.240 \quad (8)$$

wherein Imφ is the effective image diameter at the reduction side, and TL2 is the distance along the optical axis from the surface most toward the reduction side in the second optical system to the surface most toward the magnification side in the second optical system.

9. A projection optical system as defined in claim 8, in which Conditional Formula (8-1) below is satisfied:

$$0.130 < Im\varphi/TL2 < 0.200 \quad (8\text{-}1).$$

10. A projection optical system as defined in claim 1, in which Conditional Formula (10) below is satisfied:

$$4.0 < Bf/|f| \quad (10)$$

wherein Bf is the back focus (air converted distance) of the entire projection optical system.

11. A projection optical system as defined in claim 1, wherein:
a principal light ray at the maximum angle of view and the optical axis of the second optical system intersect at between the first lens group and the second lens group.

12. A projection optical system as defined in claim 1, wherein:
the intermediate image is configured such that a peripheral portion has more field curvature toward the first optical system than the portion thereof at the center of the optical axis.

13. A projection optical system as defined in claim 1, wherein:
the first optical path bending means and/or the second optical path bending means to be provided at orientations that bend optical paths at angles of 90 degrees.

14. A projection optical system as defined in claim 1, wherein:
images which are displayed by the image display elements are projected as enlarged images which are inverted 180 degrees.

15. A projection type display device, comprising:
a light source;
light valves into which light from the light source enters; and
a projection optical system as defined in claim 1 as a projection optical system that projects an optical image formed by light which is optically modulated by the light valves.

16. A projection optical system that projects images displayed by image display elements provided on a reduction side conjugate plane onto a magnification side conjugate plane as a magnified image, consisting of, in order from the reduction side to the magnification side:
a first optical system constituted by a plurality of lenses that forms the image displayed by the image display elements as an intermediate image;
a first optical path bending means for bending an optical path with a reflective surface; and
a second optical system constituted by a plurality of lenses that focuses the intermediate image on the magnification side conjugate plane;
the second optical system consisting of, in order from the reduction side to the magnification side, a first lens group having a positive refractive power, a second optical path bending means for bending an optical path with a reflective surface, and a second lens group having a positive refractive power;
Conditional Formulae (1) and (2) below being satisfied:

$$10.0 < TL1/|f| < 50.0 \quad (1)$$

$$4.0 < TL21/|f| < 30.0 \quad (2)$$

wherein TL1 is the distance along the optical axis from the surface most toward the reduction side to the surface most toward the magnification side within the first optical system, TL21 is the distance along the optical axis from the surface most toward the reduction side to the surface most toward the magnification side within the first lens group, and f is the focal length of the entire projection optical system; and
Conditional Formula (3) below being satisfied:

$$0.20 < Im\varphi \cdot f2/f^2 < 20.00 \quad (3)$$

wherein Imφ is the effective image diameter at the reduction side and f2 is the focal length of the second optical system.

17. A projection optical system as defined in claim 16, in which Conditional Formula (6-1) below is satisfied:

$$8.30 < Im\varphi \cdot f2/f^2 < 16.00 \quad (6\text{-}1).$$

18. A projection optical system that projects images displayed by image display elements provided on a reduction side conjugate plane onto a magnification side conjugate plane as a magnified image, consisting of, in order from the reduction side to the magnification side:
a first optical system constituted by a plurality of lenses that forms the image displayed by the image display elements as an intermediate image;
a first optical path bending means for bending an optical path with a reflective surface; and
a second optical system constituted by a plurality of lenses that focuses the intermediate image on the magnification side conjugate plane;
the second optical system consisting of, in order from the reduction side to the magnification side, a first lens group having a positive refractive power, a second optical path bending means for bending an optical path with a reflective surface, and a second lens group having a positive refractive power;

Conditional Formulae (1) and (2) below being satisfied:

$$10.0 < TL1/|f| < 50.0 \quad (1)$$

$$4.0 < TL21/|f| < 30.0 \quad (2)$$

wherein TL1 is the distance along the optical axis from the surface most toward the reduction side to the surface most toward the magnification side within the first optical system, TL21 is the distance along the optical axis from the surface most toward the reduction side to the surface most toward the magnification side within the first lens group, and f is the focal length of the entire projection optical system; and Conditional Formula (3) below being satisfied:

$$0.30 < f22/f21 < 2.00 \quad (3)$$

wherein f21 is the focal length of the first lens group, and f22 is the focal length of the second lens group.

19. A projection optical system as defined in claim 18, in which Conditional Formula (9-1) below is satisfied:

$$0.40 < f22/f21 < 1.70 \quad (9\text{-}1).$$

* * * * *